United States Patent
Sugiura et al.

(10) Patent No.: US 7,776,490 B2
(45) Date of Patent: Aug. 17, 2010

(54) FUEL CELL HAVING CLOSURE SEAL

(75) Inventors: Seiji Sugiura, Utsunomiya (JP);
Mikihiko Kimura, Wako (JP); Ryugo Suzuki, Nishiibaraki-gun (JP);
Masahiro Mohri, Utsunomiya (JP);
Takaki Nakagawa, Tochigi (JP);
Hiroshi Morikawa, Shioya-gun (JP);
Hiromichi Yoshida, Shioya-gun (JP);
Takeo Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1161 days.

(21) Appl. No.: 10/928,807

(22) Filed: Aug. 27, 2004

(65) Prior Publication Data
US 2005/0079400 A1    Apr. 14, 2005

(30) Foreign Application Priority Data

| Aug. 28, 2003 | (JP) | ............................. 2003-303928 |
| Aug. 28, 2003 | (JP) | ............................. 2003-303933 |
| Jul. 20, 2004 | (JP) | ............................. 2004-212000 |

(51) Int. Cl.
*H01M 8/00* (2006.01)
*H01M 8/04* (2006.01)
*H01M 8/02* (2006.01)

(52) U.S. Cl. .................... 429/514; 429/512; 429/400
(58) Field of Classification Search .............. 429/12–46
See application file for complete search history.

(56) References Cited

U.S. PATENT DOCUMENTS

| 4,640,876 | A | * | 2/1987 | Warzawski et al. ........... 429/37 |
| 6,692,860 | B2 | | 2/2004 | Inoue et al. |
| 2002/0127461 | A1 | * | 9/2002 | Sugita et al. .................. 429/35 |
| 2002/0192522 | A1 | * | 12/2002 | Wada et al. .................... 429/26 |
| 2003/0064277 | A1 | * | 4/2003 | Sugiura et al. ................ 429/38 |
| 2004/0219410 | A1 | * | 11/2004 | Tanaka et al. ................. 429/26 |

FOREIGN PATENT DOCUMENTS

| JP | 9-147891 | 6/1997 |
| JP | 2001-319666 | 11/2001 |
| JP | 2002-25587 | 1/2002 |

OTHER PUBLICATIONS

Machine Translation, JP 2002-025587, Inoue, Jan. 25, 2002.*
Japanese Office Action for Application No. 2004-212000, dated Aug. 6, 2008.

* cited by examiner

*Primary Examiner*—Dah-Wei D Yuan
*Assistant Examiner*—Adam A Arciero
(74) *Attorney, Agent, or Firm*—Lahive & Cockfield, LLP; Anthony A. Laurentano, Esq.

(57) ABSTRACT

A seal member is formed integrally on surfaces of a metal separator of a fuel cell. The seal member includes an outer seal and an inner seal provided on a surface of the metal separator. A plurality of closure seals are formed integrally with an inner edge of the inner seal. The closure seals close a space between the inner seal and a protrusion forming a fuel gas flow field.

11 Claims, 21 Drawing Sheets

FUEL CELL HAVING CLOSURE SEAL

BACKGROUND OF THE INVENTION

1. Field of the Invention

The present invention relates to a fuel cell including a membrane electrode assembly, and first and second separators sandwiching the membrane electrode assembly. The membrane electrode assembly includes a first electrode, a second electrode, and an electrolyte membrane interposed between the first and second electrodes.

2. Description of the Related Art

For example, a solid polymer fuel cell employs a membrane electrode assembly (MEA) which includes an anode and a cathode, and an electrolyte membrane interposed between the anode and the cathode. The electrolyte membrane is a polymer ion exchange membrane. The membrane electrode assembly and separators sandwiching the membrane electrode assembly make up a unit of a power generation cell for generating electricity. Generally, a predetermined number of power generation cells are stacked together to form a fuel cell stack.

In the power generation cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electric current. A gas chiefly containing oxygen or air (oxygen-containing gas) is supplied to the cathode. At the cathode, the hydrogen ions from the anode combine with the electrons and oxygen to produce water.

Various sealing structures are used for preventing the leakage of the fuel gas and the oxygen-containing gas in the power generation cell. For example, Japanese Laid-Open Patent Publication No. 2002-25587 discloses a fuel cell which is designed to improve sealing characteristics between a membrane electrode assembly and separators.

As shown in FIG. 21, the fuel cell includes a power generation cell formed by a membrane electrode assembly 1 interposed between first and second separators 2a, 2b. The membrane electrode assembly 1 includes an anode 4a, a cathode 4b, and a solid polymer electrolyte membrane 3 interposed between the anode 4a and the cathode 4b. The surface area of the anode 4a is larger than the surface area of the cathode 4b.

A first seal 5a is attached to an inner surface of a second separator 2b. The first seal 5a is provided around the cathode 4b, and tightly in contact with the solid polymer electrolyte membrane 3. Further, a second seal 5b is provided between the first and second separators 2a, 2b around the first seal 5a.

In the conventional technique, a space or gap 6 tends to be formed between the cathode 4b and the first seal 5a. In particular, if the second separator 2b is made of metal, at the time of forming the first seal 5a integrally on the second separator 2b using a die (not shown), a die presser surface (planar surface portion) for pressing the die toward the second separator 2b is required. Therefore, the gap 6 corresponding to the die presser surface is formed between the cathode 4b and the first seal 5a. The gap 6 is relatively wide.

It is likely that leakage of the reactant gas through the gap 6 occurs. The reactant gas may flow around the outer portion of the cathode 4b without flowing along a reactant gas flow field (not shown), namely, shortcut of the reactant gas may occur undesirably. Consequently, it is not possible to reliably supply the reactant gas to the reactant gas surface, and thus, the desired power generation performance cannot be maintained.

Likewise, a gap 7 tends to be formed between the first and second seals 5a, 5b. Thus, the reactant gas may flow around the outer portion of the anode 4 undesirably without flowing along a reactant gas flow field (not shown).

SUMMARY OF THE INVENTION

A main object of the present invention is to provide a fuel cell in which it is possible to prevent shortcut of reactant gases with a simple structure, and the desired power generation performance is maintained.

According to an aspect of the present invention, a fuel cell includes a membrane electrode assembly and first and second separators sandwiching the membrane electrode assembly. The membrane electrode assembly includes a first electrode, a second electrode, and an electrolyte membrane interposed between the first electrode and the second electrode. Reactant gas flow fields are formed between the membrane electrode assembly and the first and second separators for supplying reactant gases along the first and second electrodes.

A seal member is formed at least on the first separator to cover an outer edge of the first separator. The seal member includes a frame like seal surface facing the first electrode. A plurality of closure seals are provided in a space between an inner edge of the frame like seal surface and a protrusion forming the reactant gas flow field adjacent to the inner edge. The closure seals prevent flow of the reactant gas along the space between the inner edge of the frame like seal surface and the protrusion forming the reactant gas flow field.

The number, the shape, the width, and the positional arrangement of the closure seals can be determined freely depending on the application for suitably preventing leakage of the reactant gas at positions where leakage is likely to occur. As long as the closure seals effectively prevent the flow of the reactant gas, the closure seals may not completely cover the space.

Preferably, the closure seals protrude integrally from the inner edge of the frame like seal surface, and are inclined in a direction away from the first separator.

Further, it is preferable that the closure seals are liquid seals filled in the space between the inner edge of the frame like seal surface and the protrusion forming the reactant gas flow field.

It is also preferable that the closure seals are solid seals provided in the space between the inner edge of the frame like seal surface and the protrusion forming the reactant gas flow field.

Further, it is preferable that the reactant gas flow fields are formed on surfaces of the first and second separators, and each of the reactant gas flow fields comprises a serpentine groove having a turn region.

According to another aspect of the present invention, a fuel cell includes a membrane electrode assembly and first and second separators sandwiching the membrane electrode assembly. The membrane electrode assembly includes a first electrode, a second electrode, and an electrolyte membrane interposed between the first electrode and the second electrode. The surface area of the second electrode is larger than the surface area of the first electrode.

At least the first separator has a seal member on its surface facing the first electrode. The seal member includes an inner seal provided between the electrolyte membrane and the first separator, and an outer seal provided between the first and second separators, and a plurality of closure seals provided in a space between the inner seal and the outer seal for preventing flow of the reactant gas along the space.

Preferably, the closure seals are formed integrally with the inner seal and the outer seal.

Further, it is preferable that the closure seals are liquid seals filled in a space between the inner seal and the outer seal.

It is also preferable that the closure seals are solid seals provided in a space between the inner seal and the outer seal.

According to the present invention, the seal member includes the closure seals in the space between the inner edge of the frame like seal surface facing the first electrode and the protrusion forming the reactant gas flow field adjacent to the inner edge. In the presence of the closure seals, no shortcut gas channel is formed in the space. It is possible to prevent the shortcut of the reactant gas supplied into the fuel gas, i.e., prevent the reactant gas from flowing around the reaction surface of the electrode. Thus, it is possible to reduce the amount of the reactant gas which is not used in the power generation. With the simple structure, the power generation can be performed efficiently and economically.

The closure seals are formed integrally with the inner edge of the frame like seal surface, and protrude away from the first separator. Thus, the closure seals reliably seal the portion (die presser surface) between the die presser section and the first separator at the time of forming the seal. After the seal member having the closure seals are formed integrally on the first separator, the entire fuel cell is tightened together. At this time, the closure seals are deformed toward the first separator, and close the die presser surface. Accordingly, the overall operation of producing the seal member is simplified, and the shortcut gas channel is suitably closed.

Further, the closure seals may be the liquid seals filled in the space between the inner edge of the frame like seal surface and the protrusion forming the reactant gas flow field. Alternatively, the closure seals may be the solid seals. Therefore, arbitrary positions of the space are closed suitably.

Further, the reactant gas may comprise a serpentine groove having a turn region. Therefore, even in the turn region where the pressure difference is high, the leakage of the reactant gas, i.e., the shortcut of the reactant gas is prevented reliably by the closure seals. Thus, the power generation efficiency is improved.

According to the present invention, the closure seals are provided in the space between the inner seal and the outer seal. In the presence of the closure seals, no shortcut gas channel is formed between the inner seal and the outer seal. Thus, it is possible to prevent the shortcut of the reactant gas supplied into the fuel gas, i.e., prevent the reactant gas from flowing around the reaction surface of the electrode.

The closure seals are formed integrally with the inner seal and the outer seal. Thus, the overall operation of producing the seal member is simplified. Further, the closure seals may be the liquid seals filled in the space between the inner seal and the outer seal. Alternatively, the closure seals may be the solid seals. Therefore, arbitrary positions of the space are closed suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
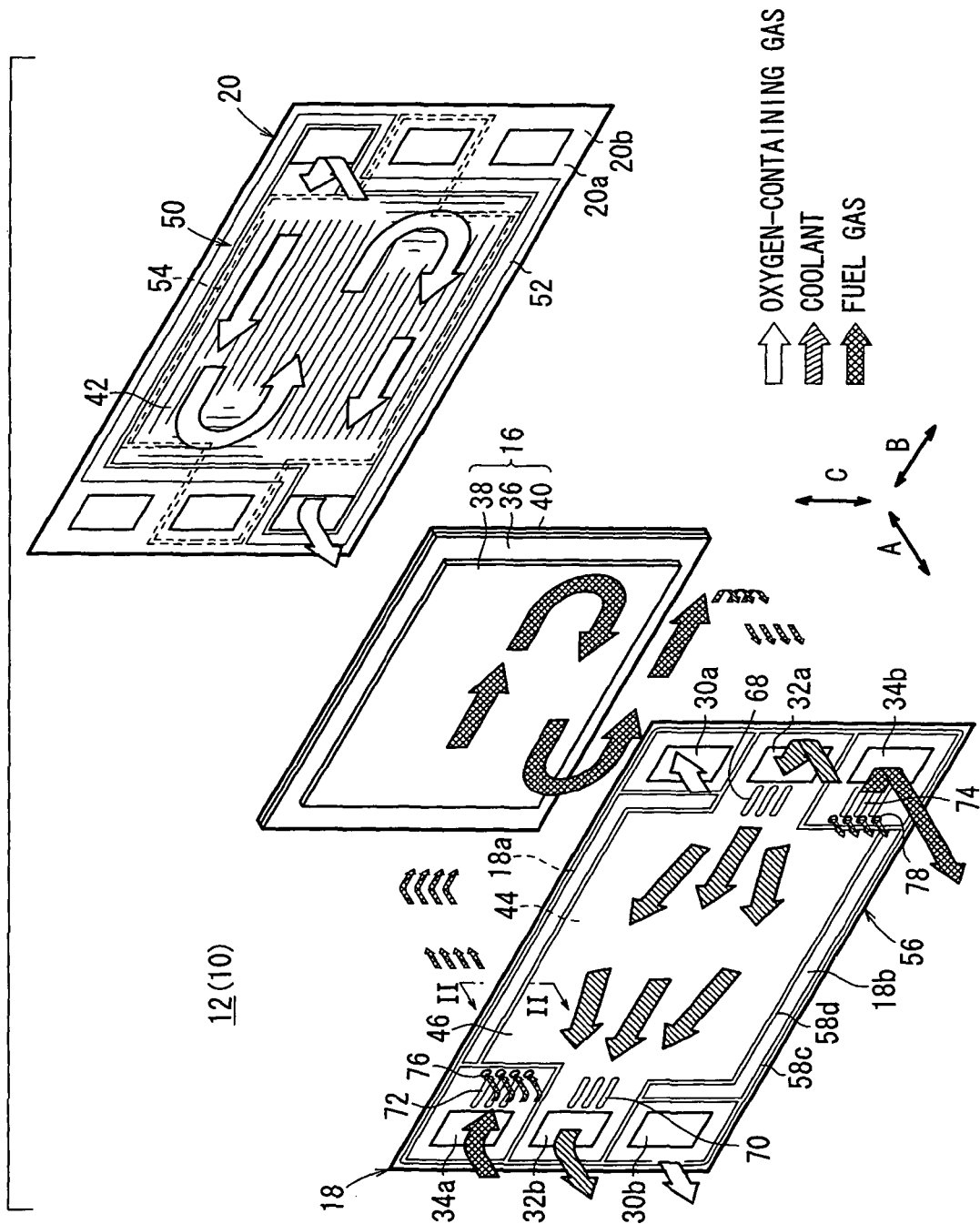
FIG. 1 is an exploded perspective view showing main components of a power generation cell of a fuel cell according to a first embodiment of the present invention.
Figure 2:
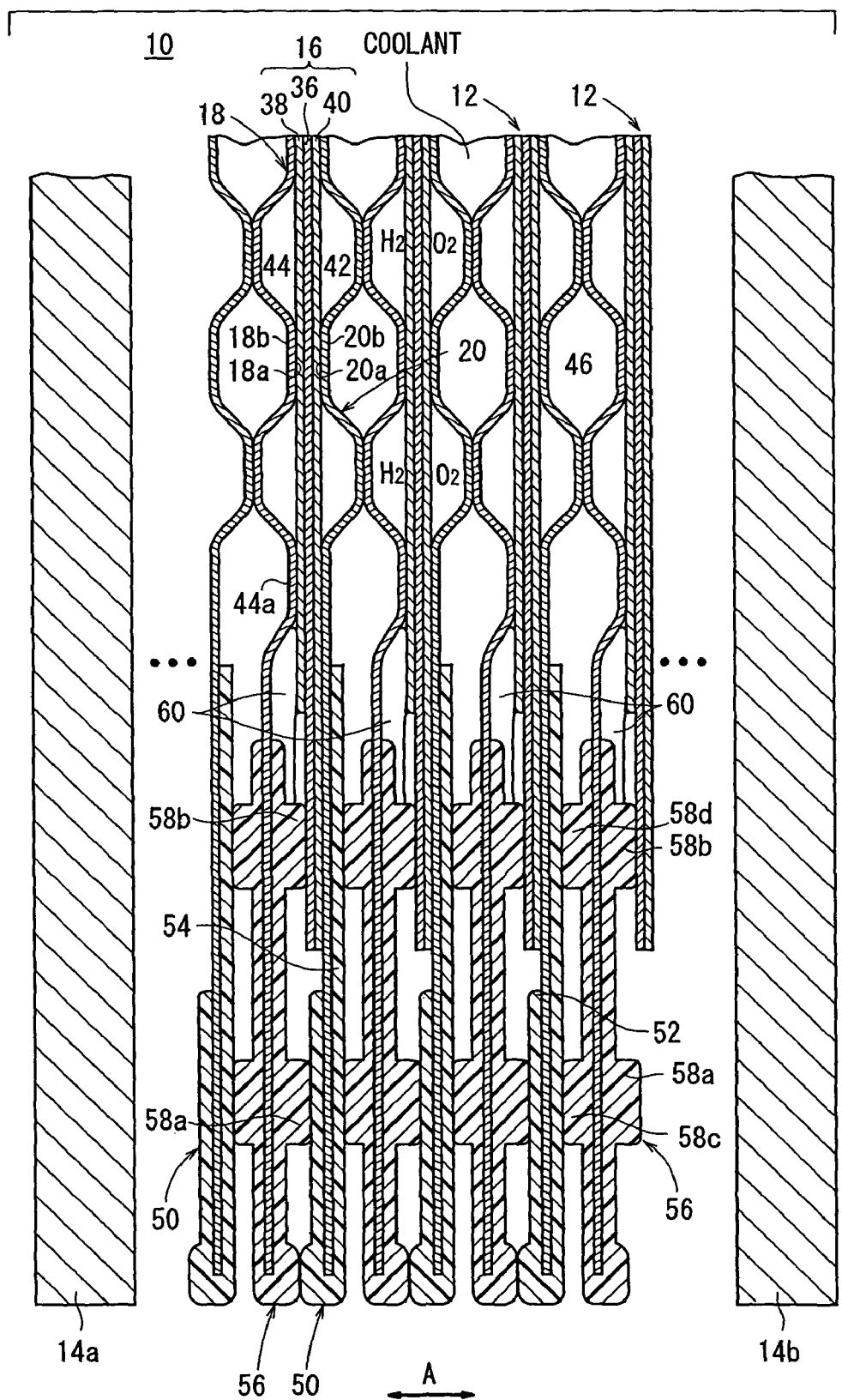
FIG. 2 is a cross sectional view taken along a line II-II in FIG. 1.

FIG. 1 is an exploded perspective view showing main components of a power generation cell 12 of a fuel cell 10 according to a first embodiment of the present invention. FIG. 2 is a cross sectional view taken along a line II-II in FIG. 1, showing the fuel cell 10 formed by stacking a plurality of the power generation cells 12 in a stacking direction indicated by an arrow A.

As shown in FIG. 2, the fuel cell 10 is formed by stacking the power generation cells 12 in the direction indicated by the arrow A. At opposite ends of the fuel cell 10 in the stacking direction, end plates 14a, 14b are provided. The end plates 14a, 14b are fixed to the fuel cell 10 by tie rods (not shown) for tightening the power generation cells 12 with a predetermined tightening force in the direction indicated by the arrow A.

As shown in FIG. 1, the power generation cell 12 includes a membrane electrode assembly 16 and an anode side first metal separator (first separator) 18 and a cathode side second metal separator (second separator) 20 sandwiching the membrane electrode assembly 16. For example, the first and second metal separators 18, 20 are steel plates, stainless steel plates, aluminum plates, plated steel sheets, or metal plates having anti-corrosive surfaces by surface treatment. The first and second metal separators 18, 20 have a thickness ranging from, e.g., 0.05 mm to 1.0 mm.

As shown in FIG. 1, at one horizontal end of the power generation cell 12 in a direction indicated by an arrow B, an oxygen-containing gas discharge passage 30b for discharging an oxygen-containing gas (reactant gas), a coolant discharge passage 32b for discharging a coolant, and a fuel gas supply passage 34a for supplying a fuel gas (reactant gas) such as a hydrogen-containing gas are arranged upwardly (vertically) in a direction indicated by an arrow C. The oxygen-containing gas discharge passage 30b, the coolant discharge passage 32b, and the fuel gas supply passage 34a extend through the power generation cell 12 in the stacking direction indicated by the arrow A.

At the other horizontal end of the power generation cell 12 in the direction indicated by the arrow B, a fuel gas discharge passage 34b for discharging the fuel gas, a coolant supply passage 32a for supplying the coolant, and an oxygen-containing gas supply passage 30a for supplying the oxygen-containing gas are arranged upwardly in the direction indicated by the arrow C. The fuel gas discharge passage 34b, the coolant supply passage 32a, and the oxygen-containing gas supply passage 30a extend through the power generation cell 12 in the direction indicated by the arrow A.

The membrane electrode assembly 16 comprises an anode (first electrode) 38, a cathode (second electrode) 40, and a solid polymer electrolyte membrane 36 interposed between the anode 38 and the cathode 40. The solid polymer electrolyte membrane 36 is formed by impregnating a thin membrane of perfluorosulfonic acid with water, for example. The surface area of the anode 38 is smaller than the surface area of the cathode 40.

Each of the anode 38 and the cathode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

Figure 3:
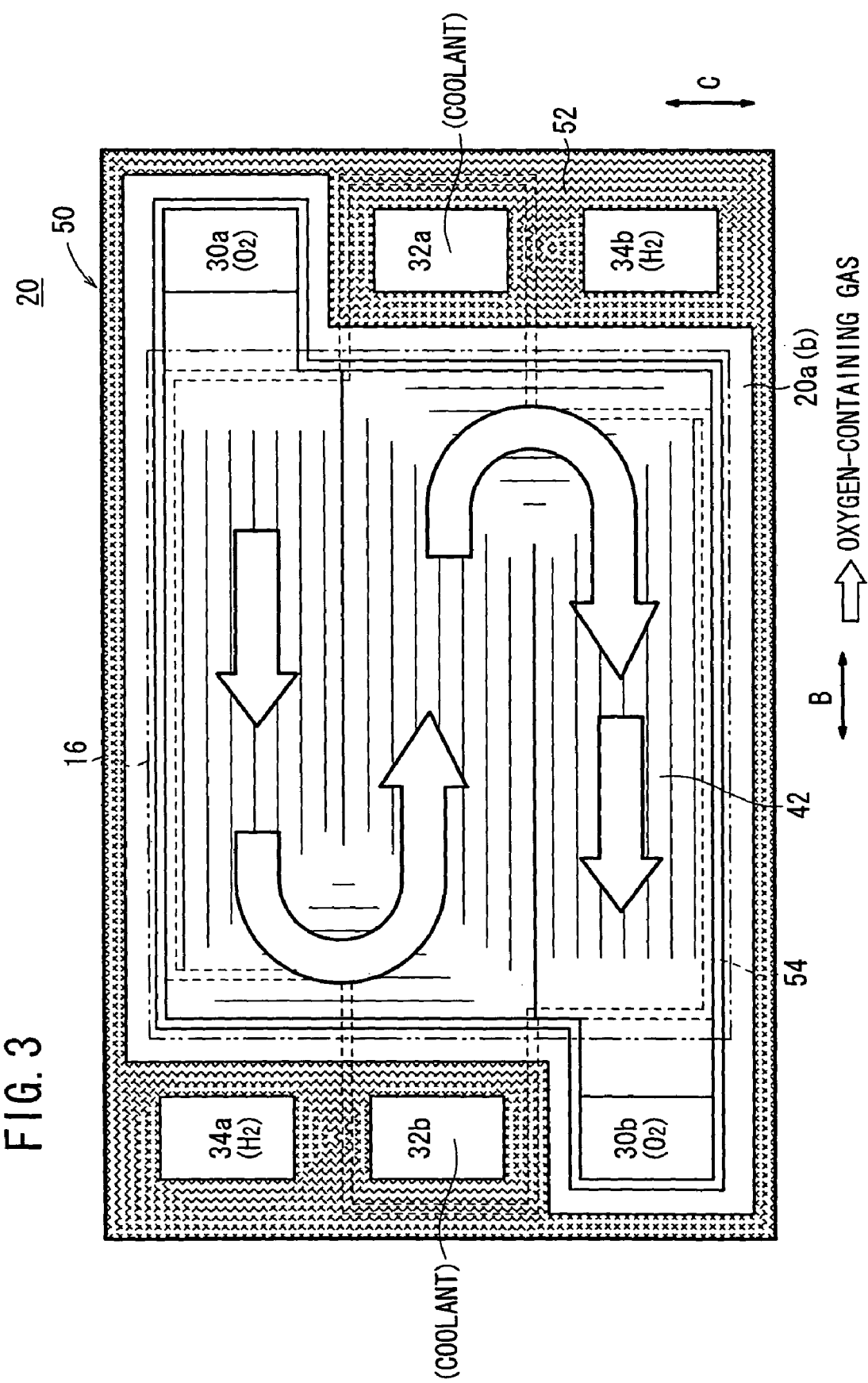
FIG. 3 is a front view showing a second metal separator of the fuel cell.

As shown in FIGS. 1 and 3, the second metal separator 20 has an oxygen-containing gas flow field (reactant gas flow field) 42 on its surface 20a facing the membrane electrode assembly 16. The oxygen-containing gas flow field 42 includes a plurality of grooves extending in a serpentine pattern such that the oxygen-containing gas flows back and forth in the direction indicated by the arrow B, and turns downwardly. The oxygen-containing gas flow field 42 is connected to the oxygen-containing gas supply passage 30a at one end, and connected to the oxygen-containing gas discharge passage 30b at the other end.

Figure 4:
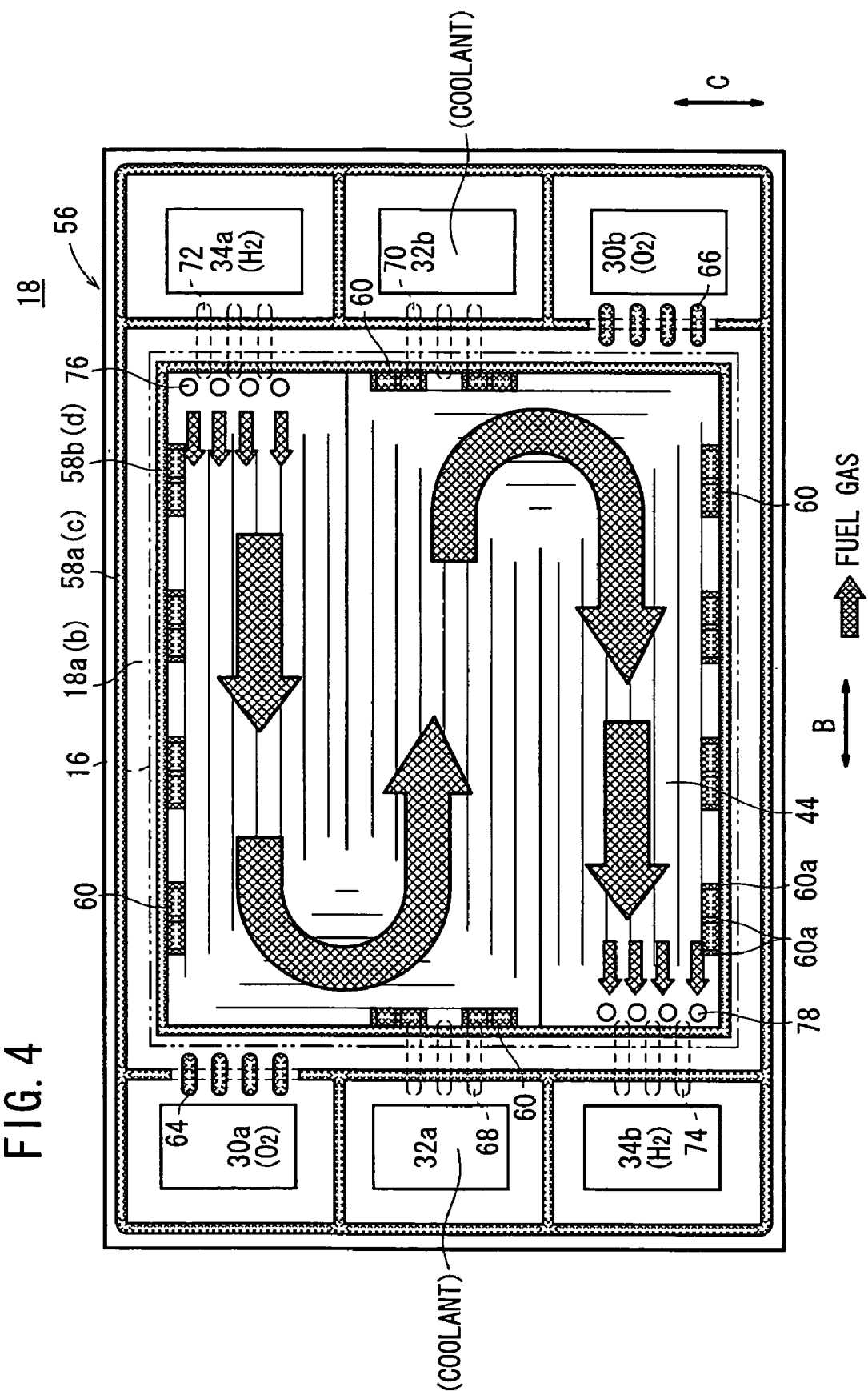
FIG. 4 is a front view showing a first metal separator of the fuel cell.

As shown in FIG. 4, the first metal separator 18 has a fuel gas flow field (reactant gas flow field) 44 on its surface 18a facing the membrane electrode assembly 16. The fuel gas flow field 44 includes a plurality of grooves extending in a serpentine pattern such that the fuel gas flows back and forth in the direction indicated by the arrow B, and turns downwardly in the direction indicated by the arrow C. The fuel gas flow field 44 is connected to the fuel gas supply passage 34a at one end, and connected to the fuel gas discharge passage 34b at the other end.

As shown in FIGS. 1 and 2, a coolant flow field 46 is formed between a surface 18b of the first metal separator 18 and a surface 20b of the second metal separator 20. The coolant flow field 46 includes a plurality of grooves extending straight in the direction indicated by the arrow B. The coolant flow field 46 is connected to the coolant supply passage 32a at one end, and connected to the coolant discharge passage 32b at the other end.

As shown in FIGS. 1 and 3, a first seal member 50 is formed integrally on the surfaces 20a, 20b of the second metal separator 20 to cover (sandwich) the outer edge of the second metal separator 20. The first seal member 50 is made of seal material, cushion material or packing material such as EPDM (Ethylene Propylene Diene Monomer), NBR (Nitrile Butadiene Rubber), fluoro rubber, silicon rubber, fluoro silicon rubber, butyl rubber (Isobutene-Isoprene Rubber), natural rubber, styrene rubber, chloroprene rubber, or acrylic rubber.

As shown in FIGS. 2 and 3, the first seal member 50 includes a first planar section 52 on the surface 18a of the first metal separator 18, and a second planar section 54 on the surface 18b of the first metal separator 18. The surface area of the second planar section 54 is larger than the surface area of the first planar section 52.

As shown in FIG. 2, the first planar section 52 is provided around the membrane electrode assembly 16 such that the first planar section 52 is spaced outwardly from an outer edge of the membrane electrode assembly 16. The second planar section 54 is provided around the membrane electrode assembly 16 such that the second planar section 54 overlaps a predetermined range of the cathode 40, i.e., partially overlaps an outer region of the cathode 40. As shown in FIG. 3, the first planar section 52 is not provided between the oxygen-containing gas supply passage 30a and the oxygen-containing gas flow field 42, and between the oxygen-containing gas discharge passage 30b and the oxygen-containing gas flow field 42. Thus, the oxygen-containing gas supply passage 30a and the oxygen-containing gas discharge passage 30b are connected to the oxygen-containing gas flow field 42. Further, the second planar section 54 is provided such that the coolant supply passage 32a is connected to the coolant discharge passage 32b.

As shown in FIGS. 1, 2, and 4, a second seal member 56 is formed integrally on the surfaces 18a, 18b of the first metal separator 18 to cover (sandwich) the outer edge of the first metal separator 18. Specifically, the second seal member 56 includes an outer seal 58a provided on the surface 18a, and near the outer edge of the first metal separator 18, and an inner seal 58b spaced inwardly from the outer seal 58a by a predetermined distance. The outer seal 58a and the inner seal 58b form a frame like seal surface facing the anode 38.

The outer seal 58a and the inner seal 58b may have various shapes, including tapered shape, trapezoid shape, or half-cylinder shape. The outer seal 58a is in contact with the first planar section 52 formed on the second metal separator 20, and the inner seal 58b is directly in contact with the solid polymer electrolyte membrane 36 of the membrane electrode assembly 16 (see FIG. 2).

As shown in FIG. 4, the outer seal 58a is formed around the oxygen-containing gas supply passage 30a, the coolant supply passage 32a, the fuel gas discharge passage 34b, the fuel gas supply passage 34a, the coolant discharge passage 32b, and the oxygen-containing gas discharge passage 30b. The inner seal 58b is formed around the fuel gas flow field 44. The outer edge of the membrane electrode assembly 16 is positioned between the inner seal 58b and the outer seal 58a.

As shown in FIG. 2, a plurality of closure seals 60 are formed in a space between an inner edge of the inner seal 58b and a protrusion 44a forming the fuel gas flow field 44 which is adjacent to the inner edge of the inner seal 58b. As described later, the closure seals 60 protrude integrally from the inner edge of the inner seal 58b, and are inclined in a direction away from the first metal separator 18. Further, each of the closure seals 60 includes protrusions 60a at its opposite ends and its central position in the longitudinal direction (see FIG. 4).

The closure seals 60 function to prevent shortcut of the fuel gas, i.e., prevent the fuel gas from flowing around the anode 38 without flowing through the serpentine grooves of the fuel gas flow field 44. The number, the shape, the width, and the positional arrangement of the closure seals 60 can be determined freely depending on the application for suitably preventing leakage of the fuel gas at positions where leakage is likely to occur.

An outer seal 58c corresponding to the outer seal 58a and an inner seal 58d corresponding to the inner seal 58b are provided on the surface 18b of the first separator 18 (see FIGS. 1 and 2). The shapes of the outer seal 58c and the inner seal 58d are similar to the shapes of the outer seal 58a and the inner seal 58b.

As shown in FIG. 4, the outer seal 58a includes a plurality of flow guides 64 connecting the oxygen-containing gas supply passage 30a and the oxygen-containing gas flow field 42. Further, the outer seal 58a includes a plurality of flow guides 66 connecting the oxygen-containing gas discharge passage 30b and the oxygen-containing gas flow field 42.

As shown in FIGS. 1 and 4, a plurality of flow guides 68 connecting the coolant supply passage 32a and the coolant flow field 46, and a plurality of flow guides 70 connecting the coolant discharge passage 32b and the coolant flow field 46 are formed on the surface 18b of the first metal separator 18. Further, a plurality of flow guides 72 are provided adjacent to the fuel gas supply passage 34a, and a plurality of flow guides 74 are provided adjacent to the fuel gas discharge passage 34b on the surface 18b of the first metal separator 18.

As shown in FIG. 1, a plurality of supply holes 76 and discharge holes 78 are provided outside the inner seal 58d, near the flow guides 72, and the flow guides 74, respectively. The supply holes 76 extend through the first metal separator 18, and are connected to the inlet of the fuel gas flow field 44. The discharge holes 78 extend through the first metal separator 18, and are connected to the outlet of the fuel gas flow field 44. The supply holes 76 and the discharge holes 78 at the inlet and outlet of the fuel gas flow field 44 are positioned inside the inner seal 58b on the surface 18a of the first metal separator 18 (see FIG. 4).

Next, operation of assembling the fuel cell 10 will be described below.

The second seal member 56 is formed integrally on the first metal separator 18, and the first seal member 50 is formed integrally on the second metal separator 20. At this time, the fuel gas flow field 44 is formed on the surface 18a, and the coolant flow field 46 is formed on the surface 18b of the first metal separator 18 by metal stamping.

Figure 5:
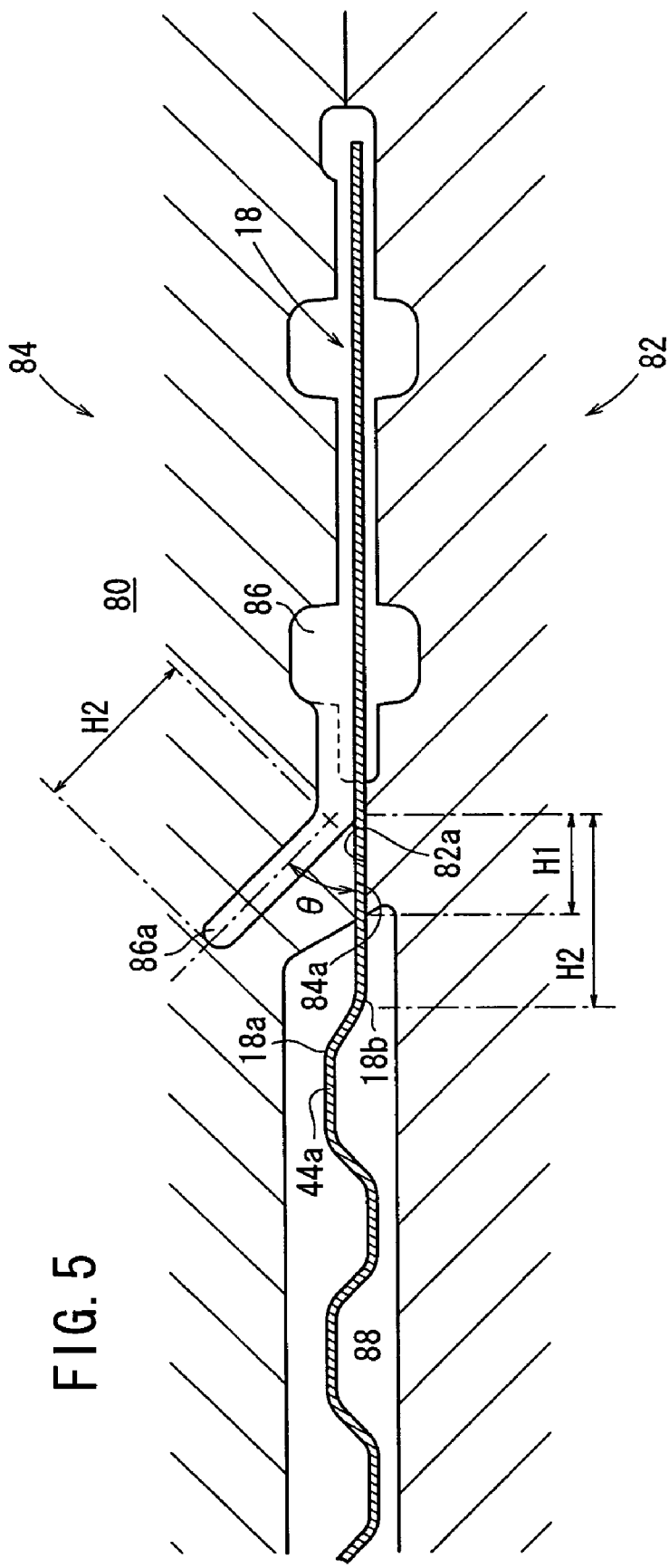
FIG. 5 is a die used for forming a second seal member integrally on the first metal separator.

Specifically, as shown in FIG. 5, the first metal separator 18 is placed in a seal forming die 80. The die 80 includes a first die 82 and a second die 84. A cavity 86 and a relief 88 are formed between the first die 82 and the second die 84. The relief 88 receives the corrugated portion forming the fuel gas flow field 44 and the coolant flow field 46 on the first metal separator 18. Die presser sections 82a, 84a in contact with the first metal separator 18 are provided between the relief 88 and the cavity 86 over a distance H1.

The shape of the cavity 86 corresponds to the shape of the second seal member 56. An inner edge of the cavity 86 on the side of the protrusion 44a is connected to a cavity 86a. The shape of the cavity 86a corresponds to the protruding shape of the closure seal 60. The cavity 86a is provided in the second die 84, and inclined at an angle θ° (30°<θ<60°) away from the surface 18a of the first metal separator 18. The length H2 of the cavity 86 is determined such that the closure seal 60 covers to a point adjacent to the protrusion 44a for achieving the desired closure function.

When the first die 82 and the second die 84 are closed to sandwich the first metal separator 18, melted rubber is filled in the cavities 86, 86a. Then, after a predetermined period of time has passed, the second seal member 56 is formed integrally on the surfaces 18a, 18b of the first metal separator 18, and the closure seal 60 protrudes integrally from the inner edge of the inner seal 58b of the second seal member 56 such that the closure seal 60 is inclined in the direction away from the first metal separator 18.

Then, the first and second dies 82, 84 are opened, and the first metal separator 18 is separated from the die 80. Likewise, the first seal member 50 is formed integrally on both surfaces 20a, 20b of the second separator 20 using the seal forming die (not shown).

Then, after the membrane electrode assembly 16 is interposed between the first metal separator 18 and the second metal separator 20, the membrane electrode assembly 16 and the first and second metal separators 18, 20 are pressed together in the stacking direction indicated by the arrow A. Thus, as shown in FIG. 2, the closure seal 60 is tilted toward the surface 18a of the first metal separator 18, and closes the space between the inner edge of the inner seal 58b and the protrusion 44a forming the fuel gas flow field 44 adjacent to the inner edge. Thus, the power generation cell 12 is produced. A predetermined number of the power generation cells 12 are stacked together, and the power generation cells 12 are tightened in the stacking direction. In this manner, the fuel cell 10 is assembled.

Next, operation of the fuel cell 10 will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, an ethylene glycol or an oil is supplied to the coolant supply passage 32a.

The oxygen-containing gas flows from the oxygen-containing gas supply passage 30a into the oxygen-containing gas flow field 42 of the second metal separator 20 (see FIGS. 1 and 3). Then, the oxygen-containing gas flows in a serpentine pattern in the direction indicated by the arrow B, and moves downwardly along the cathode 40 of the membrane electrode assembly 16 for inducing an electrochemical reaction at the cathode 40. The fuel gas flows from the fuel gas supply passage 34a into the fuel gas flow field 44 of the first metal separator 18 through the supply holes 76 (see FIG. 4). The fuel gas flows in a serpentine pattern in the direction indicated by the arrow B, and moves downwardly along the anode 38 of the membrane electrode assembly 16 for inducing an electrochemical reaction at the anode 38 (see FIG. 1).

Thus, in the membrane electrode assembly 16, the oxygen-containing gas supplied to the cathode 40, and the fuel gas supplied to the anode 38 are consumed in the electrochemical reactions at catalyst layers of the cathode 40 and the anode 38 for generating electricity.

After the oxygen in the oxygen-containing gas is consumed at the cathode 40, the oxygen-containing gas is discharged into the oxygen-containing gas discharge passage 30b in the direction indicated by the arrow A. Likewise, after the fuel gas is consumed at the anode 38, the fuel gas is discharged through the discharge holes 78 into the fuel gas discharge passage 34b in the direction indicated by the arrow A.

The coolant from the coolant supply passage 32a flows into the coolant flow field 46 between the first and second metal separators 18, 20, and flows in the direction indicated by the arrow B for cooling the membrane electrode assembly 16. Then, the coolant is discharged into the coolant discharge passage 32b (see FIG. 1).

In the first embodiment, the second seal member 56 includes a plurality of closure seals 60 formed integrally with the inner edge of the inner seal 58b. The closure seals 60 close the space between the inner edge of the inner seal 58b and the protrusion 44a forming the fuel gas flow field 44 adjacent to the inner edge.

Thus, no shortcut passage is formed between the inner seal 58b and the protrusion 44a. Accordingly, it is possible to reliably prevent the shortcut of the fuel gas as the reactant gas supplied into the fuel cell 10, i.e., prevent the fuel gas from flowing around the electrode surface. Thus, it is possible to reduce the amount of the fuel gas which is not used in the power generation. With the simple structure, the power generation can be performed efficiently and economically.

Further, the closure seals 60 are formed integrally with the inner edge of the inner seal 58b. In producing the second seal member 56, the inner seal 58b, the outer seal 58a, and the closure seals 60 are formed at the same time. Thus, the overall operation of producing the second seal member 56 is simplified efficiently.

The fuel gas flow field 44 includes serpentine grooves having turn regions. Even in the turn regions where the pressure difference between the grooves is large, the leakage of the fuel gas, i.e., the shortcut of the fuel gas is prevented reliably by the closure seals 60.

Further, the closure seals 60 are provided integrally with the inner seal 58b, and protrude in the direction away from the surface 18a of the first metal separator 18. Thus, as shown in FIG. 5, the die presser surface as the contact surface between the die presser section 84a and the first metal separator 18 is reliably closed by the closure seals 60.

That is, at the time the components of the fuel cell 10 are tightened together after the second seal member 56 including the closure seals 60 are formed integrally with the first metal separator 18, the closure seals 60 are deformed toward the surface 18a of the first metal separator to close the die presser surface. Thus, the overall operation of producing the second seal member 56 is simplified, and the shortcut gas passage is closed suitably.

Figure 6:
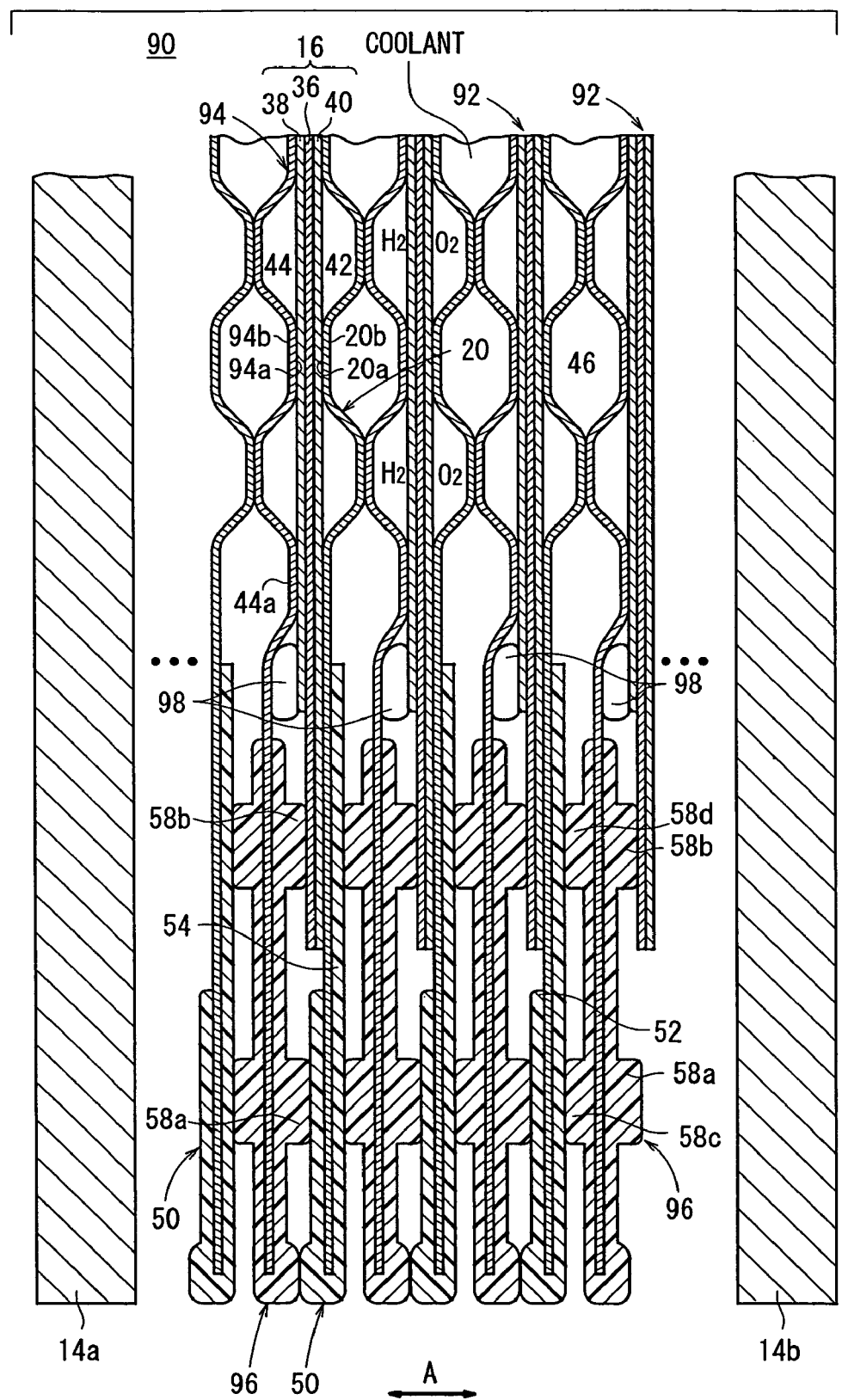
FIG. 6 is a cross sectional view showing a fuel cell according to a second embodiment of the present invention.

FIG. 6 is a cross sectional view showing a fuel cell 90 according to a second embodiment of the present invention. The constituent elements that are identical to those of the fuel cell 10 according to the first embodiment are labeled with the same reference numeral, and description thereof will be omitted. In third through seventh embodiments as described later, the constituent elements that are identical to those of the fuel cell 10 according to the first embodiment are labeled with the same reference numeral, and description thereof will be omitted.

Figure 7:
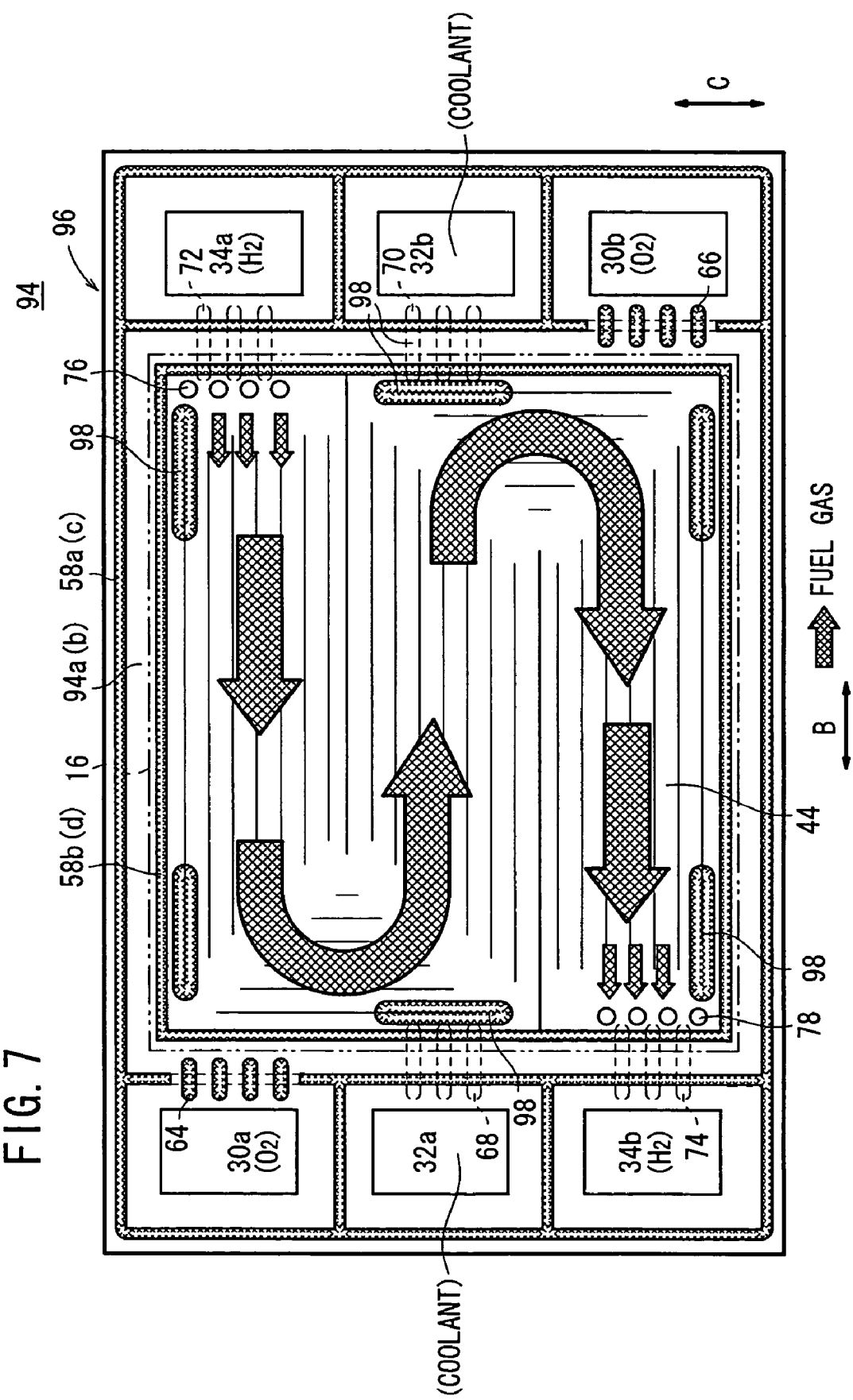
FIG. 7 is a front view showing a first metal separator of the fuel cell.

Each of power generation cells 92 of the fuel cell 90 has a first metal separator 94. A second seal member 96 is formed integrally on both surfaces 94a, 94b of the first metal separator 94. The second seal member 96 includes an outer seal 58a and the inner seal 58b on the surface 94a. A plurality of closure seals 98 are provided at predetermined positions in a space between the inner edge of the inner seal 58b and the protrusion 44a (see FIGS. 6 and 7). The closure seals 98 are formed separately from the second seal member 96 in advance in a line shape. Preferably, the closure seals 98 and the second seal member 96 are made of the same material.

In the second embodiment, it is possible to reliably prevent the shortcut of the fuel gas supplied into the fuel cell 90, i.e., prevent the fuel gas from flowing around the reaction surface of the electrode in the fuel gas flow field 44. With the simple structure, for example, the power generation can be performed efficiently and economically. In the second embodiment, the same advantages as with the first embodiment can be obtained.

Figure 8:
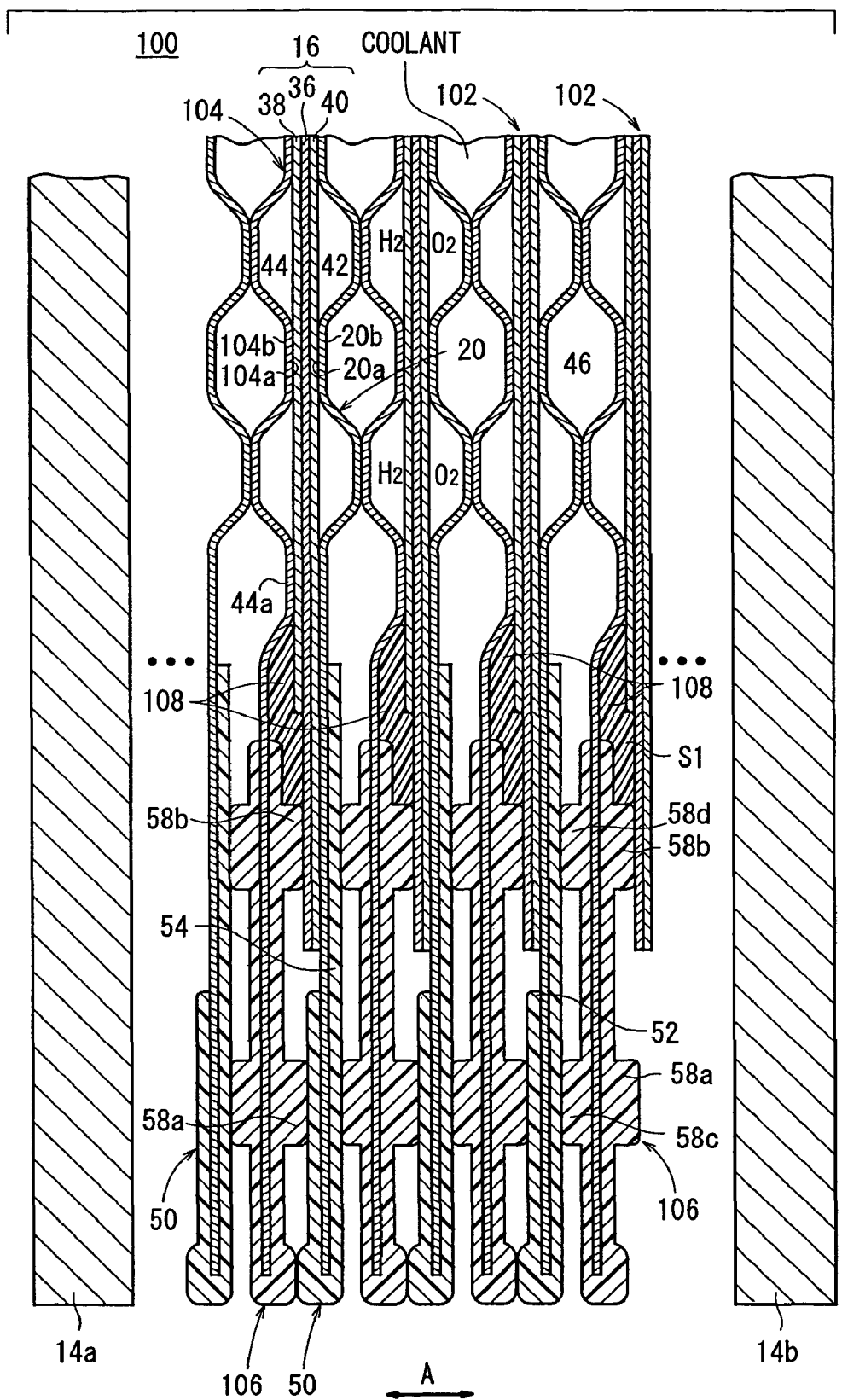
FIG. 8 is a cross sectional view showing a fuel cell according to a third embodiment of the present invention.

FIG. 8 is a cross sectional view showing a fuel cell 100 according to a third embodiment of the present invention. Each of power generation cells 102 of the fuel cell 100 has a first metal separator 104. A second seal member 106 is formed integrally on both surfaces 104a, 104b of the first metal separator 104. The second seal member 106 includes an outer seal 58a and an inner seal 58b provided on the surface 104a of the first metal separator 104. A plurality of liquid seals (closure seals) 108 are provided at predetermined positions between the inner seal 58b and the protrusion 44a (see FIGS. 8 and 9).

Figure 10:
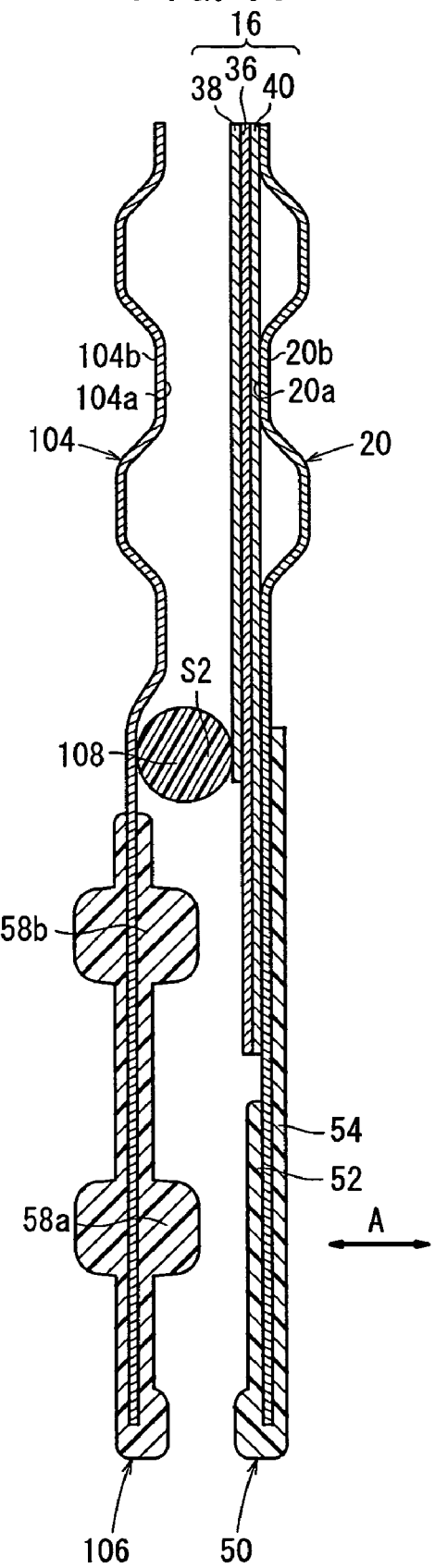
FIG. 10 is a view showing a process of applying a liquid seal between the first metal separator and a second metal separator.
Figure 11:
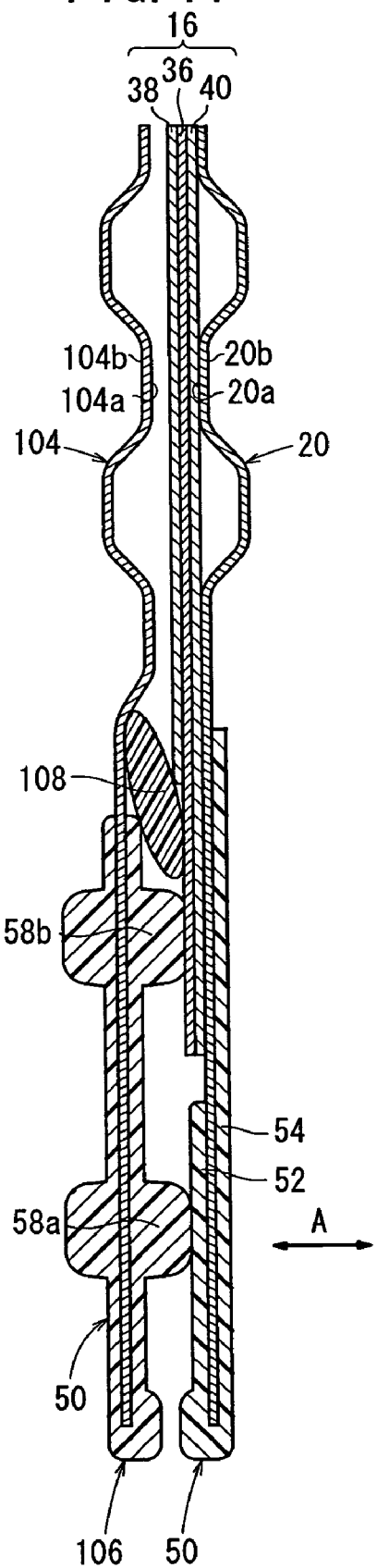
FIG. 11 is a view showing a process of placing a liquid seal between the first metal separator and the second metal separator.

The process of providing the liquid seals 108 will be described. Firstly, as shown in FIG. 10, when the first metal separator 104 and the second metal separator 20 are spaced away from each other, the liquid seal 108 is applied to the space between the inner seal 58b and the protrusion 44a. Then, as shown in FIG. 11, the first metal separator 104 and the second metal separator 20 move toward each other, and the fuel cell 100 is pressurized in the stacking direction.

Figure 9:
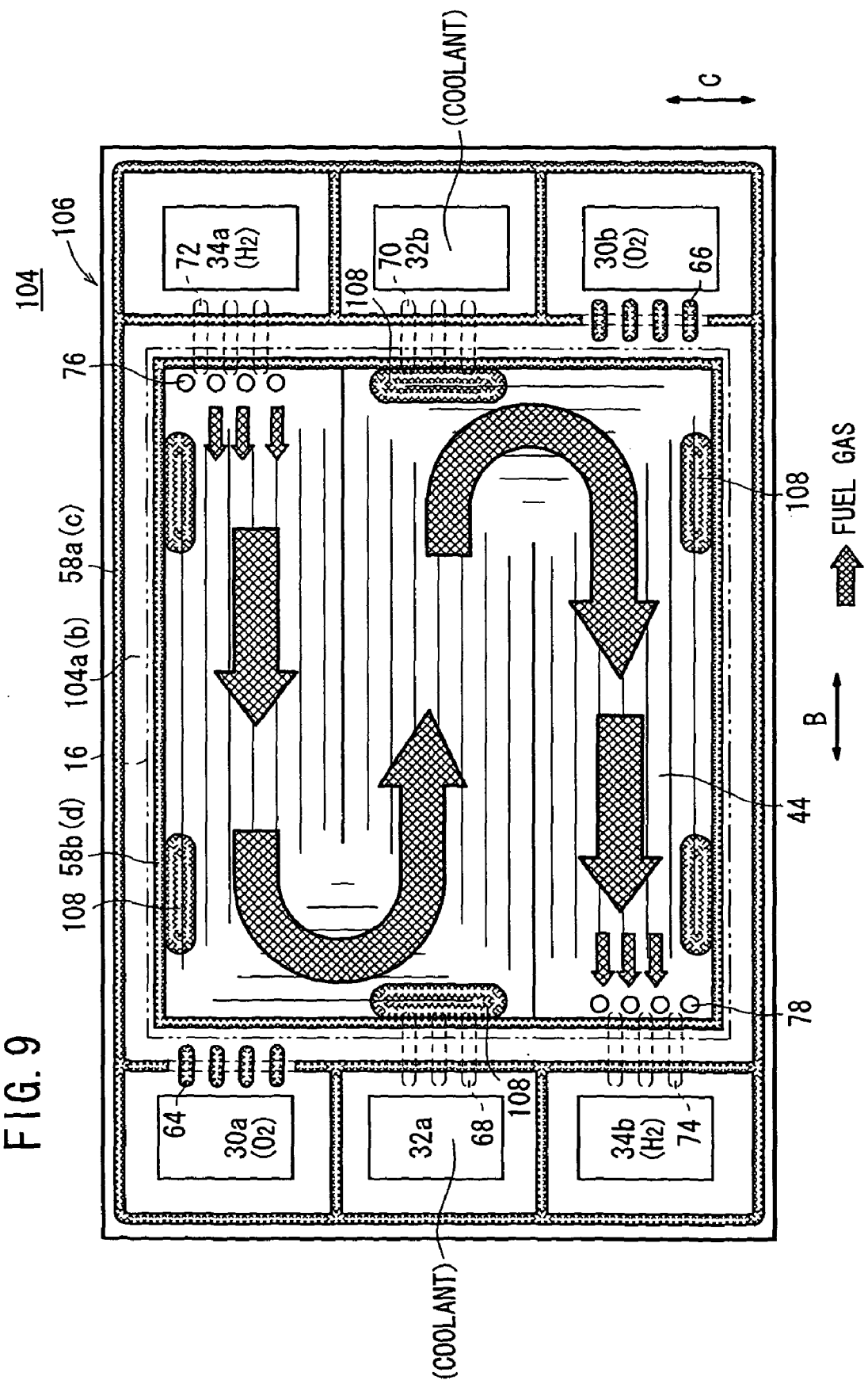
FIG. 9 is a front view showing a first metal separator of the fuel cell.

The cross sectional area S1 of the liquid seal 108 when the load pressure in the normal operating condition is applied (see FIG. 8) is smaller than the cross sectional area S2 of the liquid seal 108 before the fuel cell 100 is assembled (S1<S2, see FIG. 9).

The liquid seals 108 are solidified in a condition where the pressure corresponding to the load pressure in the normal operating condition is applied to the liquid seals 108. Thus, the liquid seals 108 are reliably filled as the closure seals in most of the space between the inner seal 58b and the protrusion 44a (see FIG. 8). Therefore, with the simple structure, for example, the power generation can be performed efficiently. In the third embodiment, the same advantages as with the first and second embodiments can be obtained.

Figure 12:
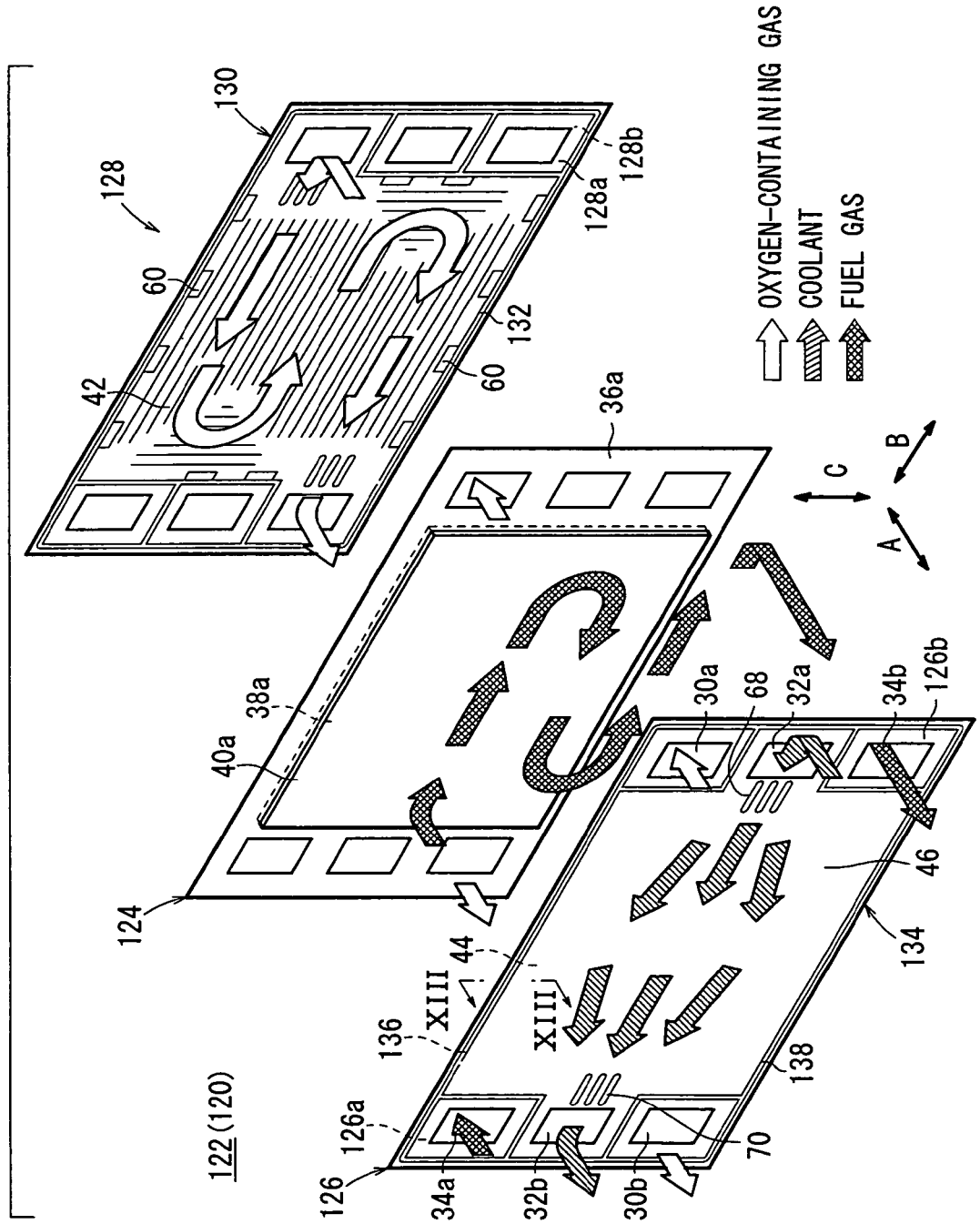
FIG. 12 is an exploded perspective view showing main components of a power generation cell of a fuel cell according to a fourth embodiment of the present invention.

FIG. 12 is an exploded perspective view showing main components of a power generation cell 122 of a fuel cell 120 according to a fourth embodiment of the present invention.

The power generation cell 122 includes a membrane electrode assembly 124, a first metal separator 126, and a second metal separator 128. The membrane electrode assembly 124 includes an anode 38a, a cathode 40a, and a solid polymer electrolyte membrane 36a interposed between the anode 38a and the cathode 40a. The solid polymer electrolyte membrane 36a has a passage such as an oxygen-containing gas supply passage 30a. The surface area of the anode 38a is substantially the same as the surface area of the cathode 40a (see FIG. 13).

A first seal member 130 is formed integrally on surfaces 128a, 128b of the second metal separator 128 to cover (sandwich) the outer edge of the second metal separator 128. The first seal member 130 includes a frame like seal surface 132 provided on the surface 128a of the second metal separator 128. The frame like seal surface 132 is directly in contact with the solid polymer electrolyte membrane 36a. A plurality of closure seals 60 are formed in the space between the inner edge of the frame like seal surface 132 and the protrusion 42a forming the oxygen-containing gas flow field 42 adjacent to the inner edge of the frame like seal surface 132.

Figure 14:
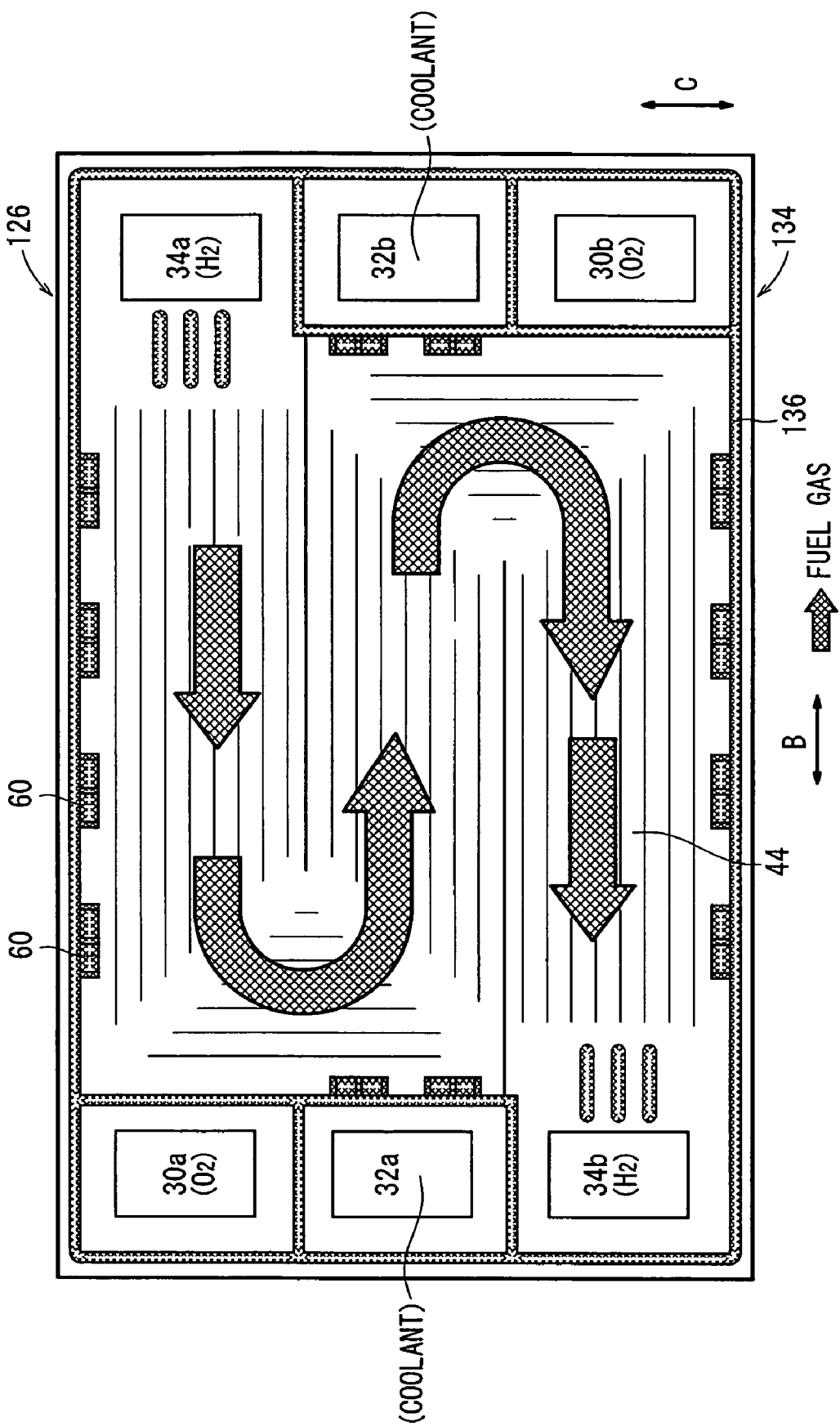
FIG. 14 is a front view showing a first metal separator of the fuel cell.

A second seal member 134 is formed integrally on surfaces 126a, 126b of the first metal separator 126. The second seal member 134 includes a first frame like seal surface 136 provided on the surface 126a and a second frame like seal surface 138a provided on the surface 126b. The first frame like seal surface 136 is directly in contact with the solid polymer electrolyte membrane 36a. The second frame like seal surface 138 is in contact with the first seal member 130 provided on the second metal separator 128. A plurality of closure seals 60 are formed in the space between the inner edge of the first frame like seal surface 136 and the protrusion 44a forming the fuel gas flow field 44 adjacent to the inner edge of the first frame like seal surface 136 (see FIG. 14).

In the fourth embodiment, the membrane electrode assembly 124 is interposed between the first metal separator 126 and the second metal separator 128. The solid polymer electrolyte membrane 36a of the membrane electrode assembly 124 is sandwiched between the frame like seal surface 132 of the first seal member 130 and the first frame like seal surface 136 of the second seal member 134. The closure seals 60 are formed on both of the first and second seal members 130, 134.

Figure 13:
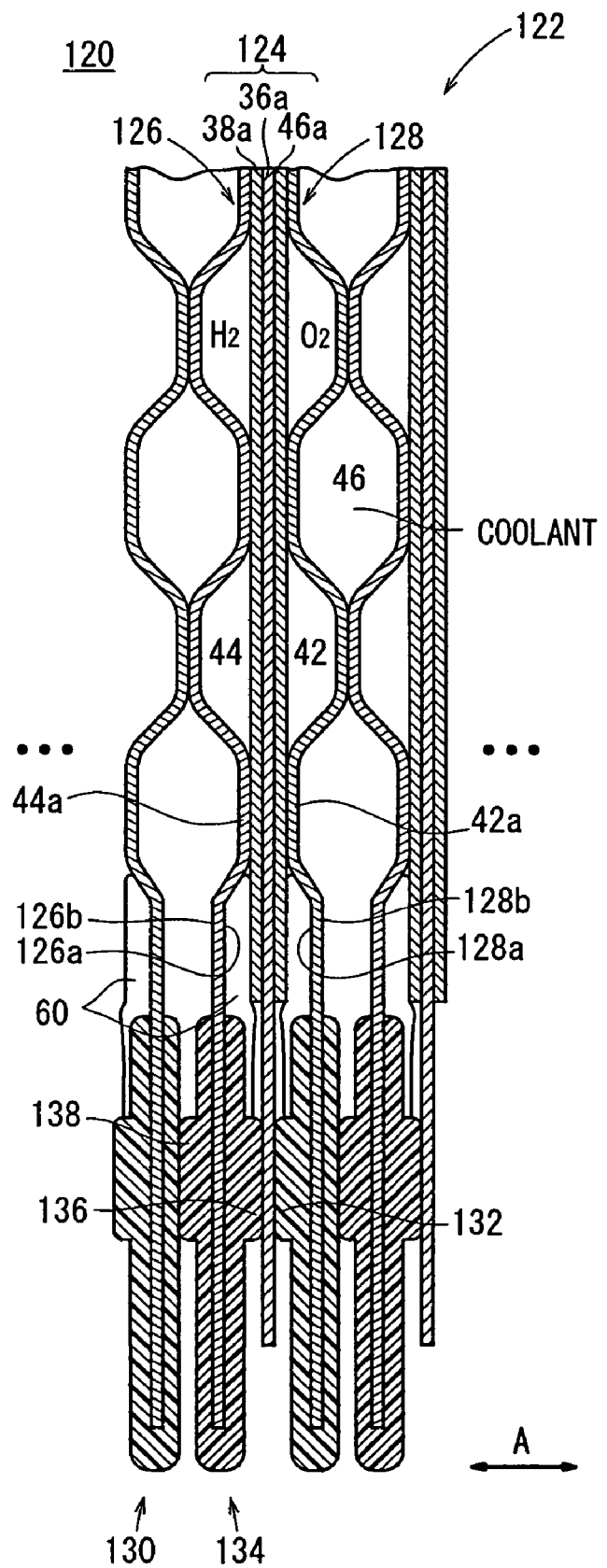
FIG. 13 is a cross sectional view taken along a line XIII-III in FIG. 12.

The closure seals 60 close the space between the inner edge of the frame like seal surface 132 and the protrusion 42a forming the oxygen-containing gas flow field 42 adjacent to the inner edge, and the space between the inner edge of the first frame like seal surface 136 and the protrusion 44a forming the fuel gas flow field 44 adjacent to the inner edge (see FIG. 13).

Therefore, it is possible to prevent the shortcut of the oxygen-containing gas and the fuel gas, i.e., prevent the oxygen-containing gas and the fuel gas from flowing around the reaction surfaces of the electrodes. With the simple structure, for example, the power generation can be performed efficiently and economically. In the fourth embodiment, the same advantages as with the first through third embodiments can be obtained.

In the fourth embodiment, the closure seals 60 as used in the first embodiment are used. However, it is not essential to use the closure seals 60. The closure seals 98 as used in the second embodiment or the liquid seals 108 as used in the third embodiment may be used instead of the closure seals 60.

Figure 15:
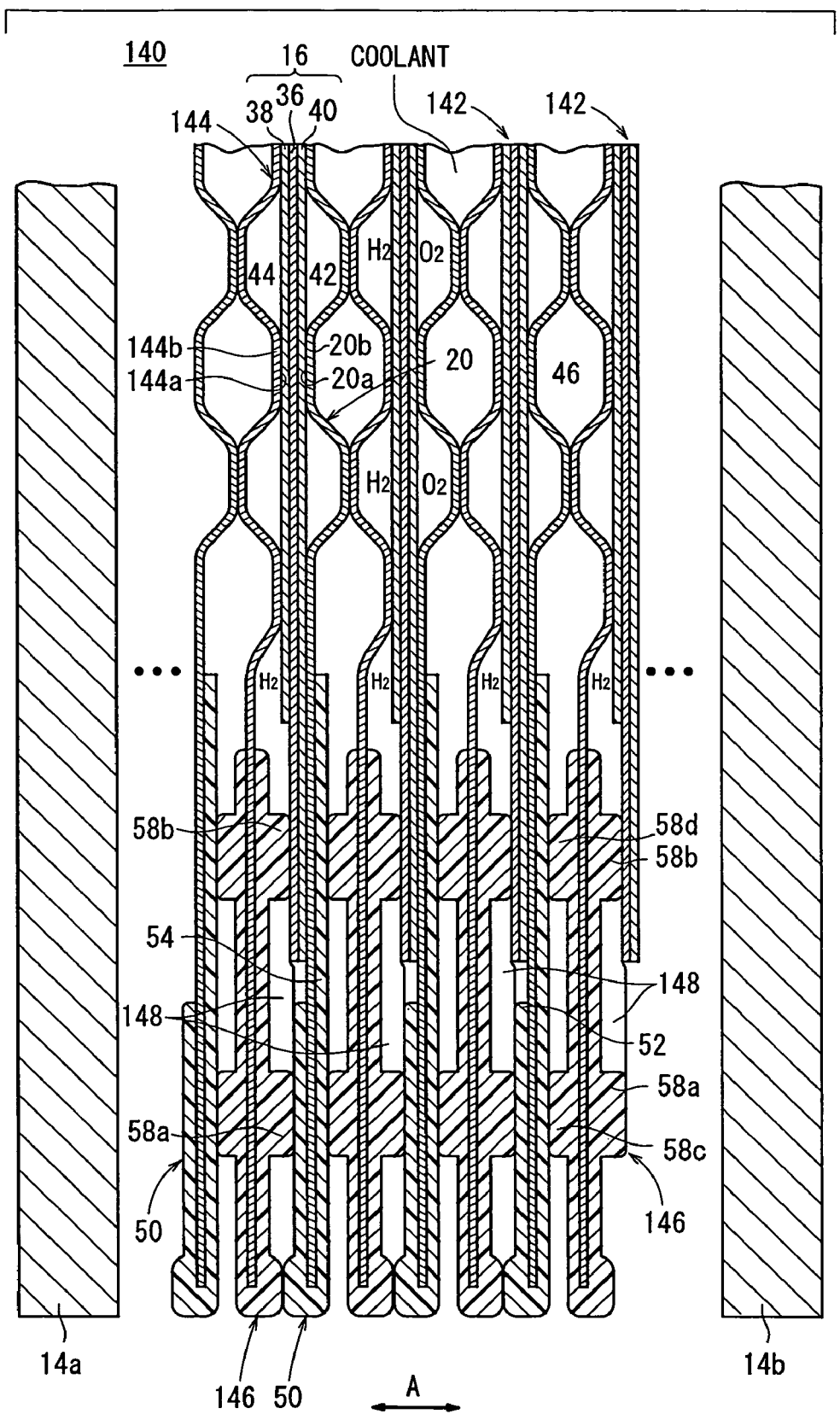
FIG. 15 is a cross sectional view showing a fuel cell according to a fifth embodiment of the present invention.

FIG. 15 is a cross sectional view showing a fuel cell 140 according to a fifth embodiment of the present invention.

Each of power generation cells 142 of the fuel cell 140 includes a first metal separator 144. A second seal member 146 is formed integrally on the surfaces 144a, 144b of the first metal separator 144. The second seal member 146 includes an outer seal 58a and an inner seal 58b formed on the surface 144a of the first metal separator 144. A plurality of closure seals 148 are formed in the space between the inner seal 58b and the outer seal 58a. The closure seals 148 prevent the leakage of the oxygen-containing gas from the serpentine grooves of the oxygen-containing gas flow field 42 and the leakage of the fuel gas from the fuel gas flow field 44. Further, the closure seals 148 prevent the shortcut of the fuel gas and the oxygen-containing gas, i.e., prevent the fuel gas from flowing along the outer edge of the anode 38, and prevent the oxygen-containing gas from flowing along the outer edge of the cathode 40. The number, the shape, the width, and the positional arrangement of the closure seals 148 can be determined freely depending on the application for suitably preventing leakage of the fuel gas at positions where leakage is likely to occur.

Figure 16:
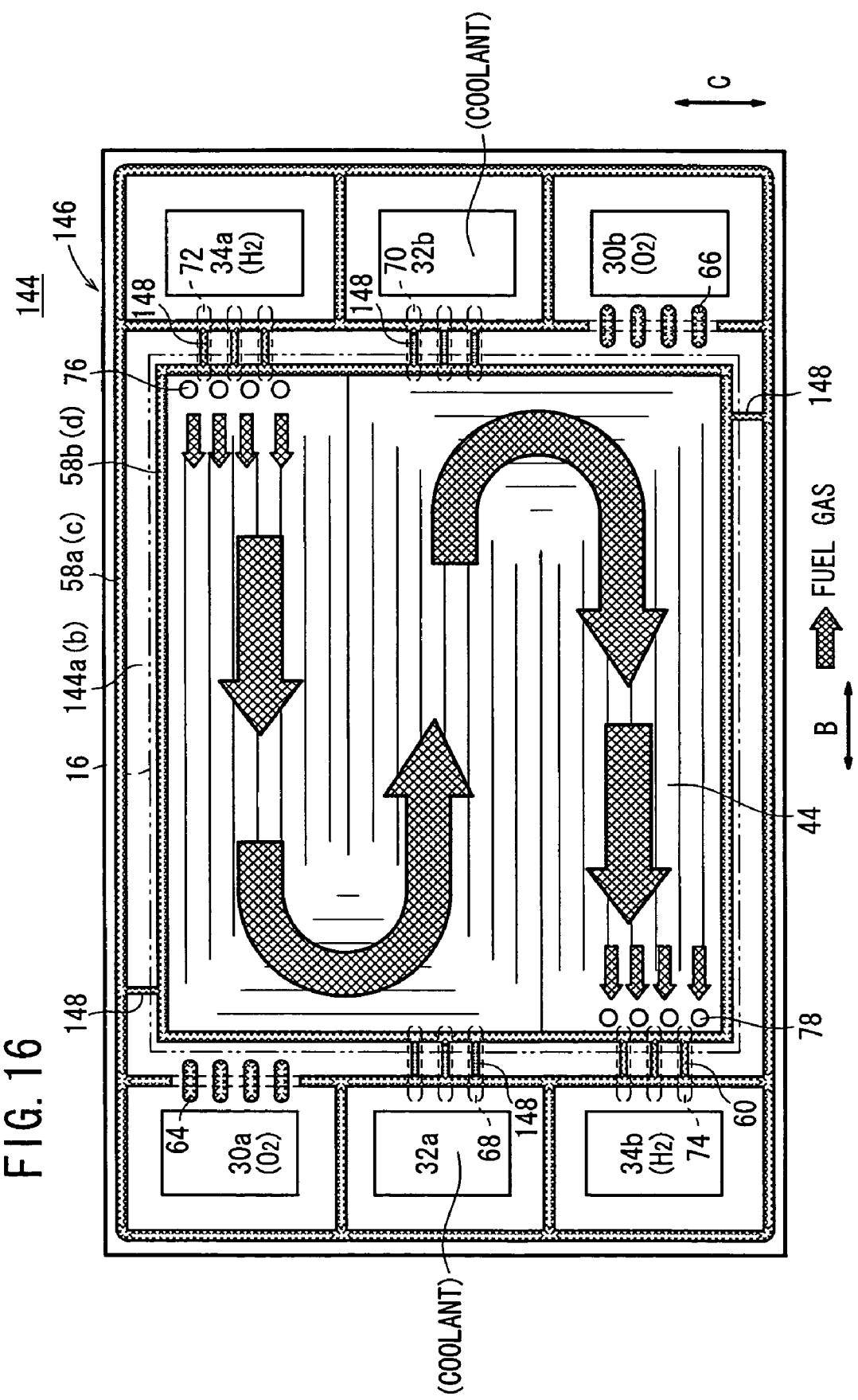
FIG. 16 is a front view showing a first metal separator of the fuel cell.

As shown in FIG. 16, part of the closure seals 148 of the second seal member 146 are substantially in alignment with the flow guides 68, 70, 72, and 74 in the stacking direction of the power generation cells (in the direction indicated by the arrow A in FIG. 15).

In the fifth embodiment, the second seal member 146 provided on the first metal separator 144 includes the inner seal 58b and the outer seals 58a, and the line-shaped closure seals 148 connecting the inner seal 58b and the outer seal 58a to prevent the leakage of the reactant gases such as the oxygen-containing gas and the fuel gas.

Thus, no shortcut passage is formed in the space between the inner seal 58b and the outer seal 58a. It is possible to reliably prevent the shortcut of the oxygen-containing gas (reactant gas) supplied into the fuel cell 140, i.e., prevent the oxygen-containing gas from flowing around the reaction surface of the electrode. Thus, it is possible to reduce the amount of the reactant gas which is not used in the power generation. With the simple structure, the power generation can be performed efficiently and economically.

The closure seals 148 are formed integrally with the inner seal 58b and the outer seal 58a. Therefore, in producing the second seal member 146, the inner seal 58b, the outer seal 58a, and the closure seals 148 can be formed at the same time. Thus, the overall operation of producing the second seal member 56 can be simplified significantly.

Further, the oxygen-containing gas flow field 42 includes serpentine grooves having turn regions. Even in the turn regions where the pressure difference between the grooves is large, the leakage of the oxygen-containing gas, i.e., the shortcut of the oxygen-containing gas is prevented reliably by the closure seals 148.

Figure 17:
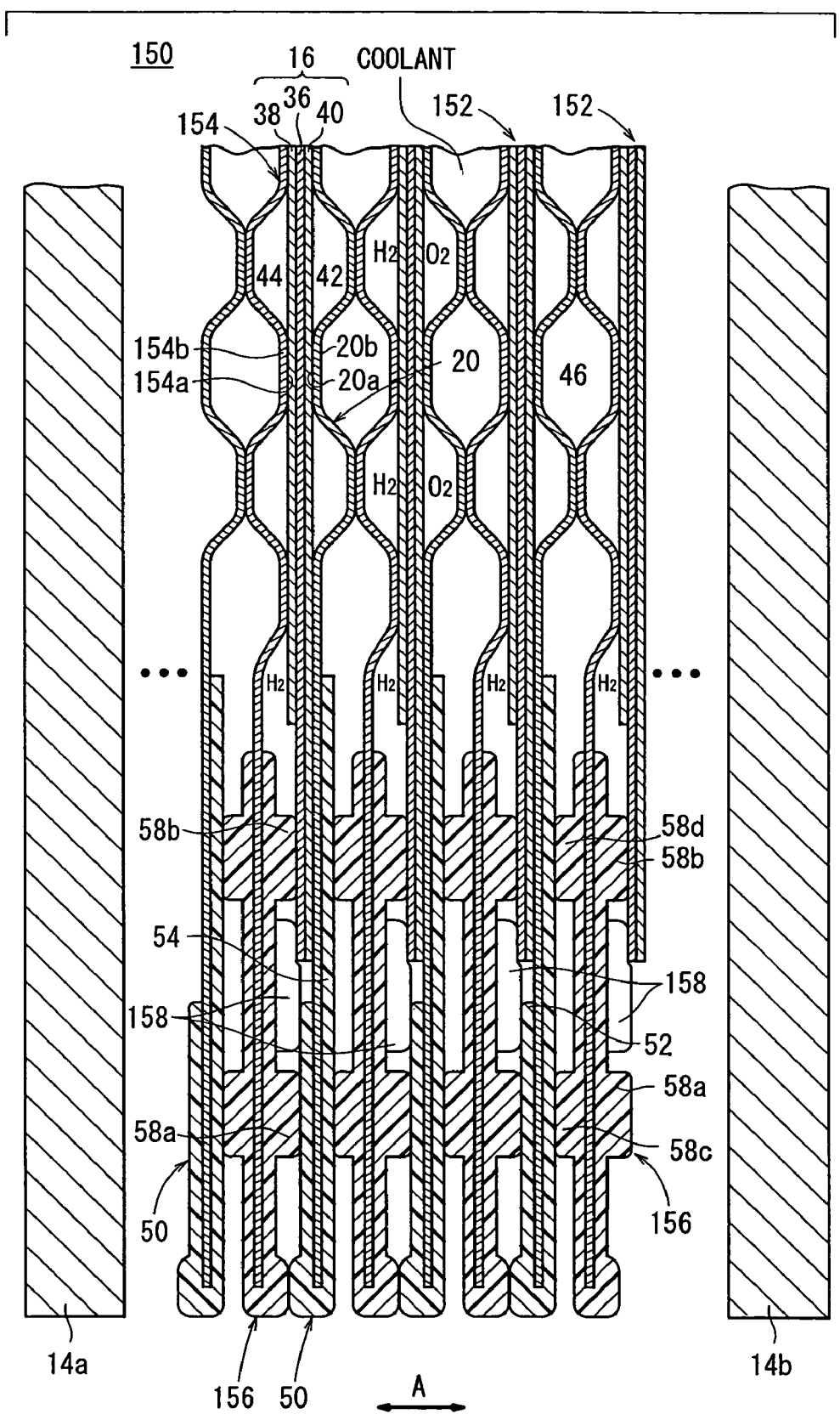
FIG. 17 is a cross sectional view showing a fuel cell according to a sixth embodiment of the present invention.

FIG. 17 is a cross sectional view showing a fuel cell 150 according to a sixth embodiment of the present invention.

Figure 18:
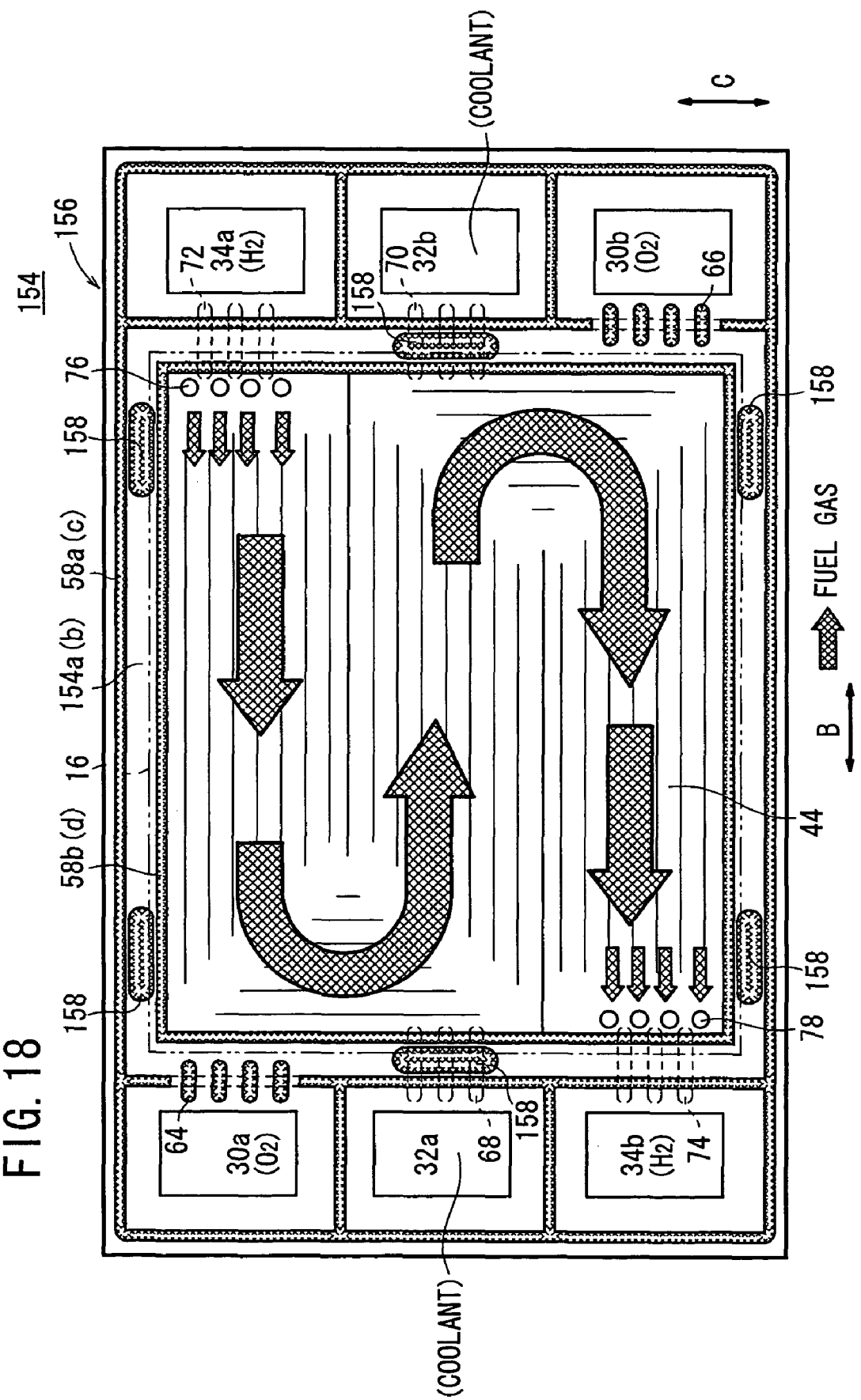
FIG. 18 is a front view showing a first metal separator of the fuel cell.

Each of power generation cells 152 of the fuel cell 150 includes a first metal separator 154. A second seal member 156 is formed integrally on surfaces 154a, 154b of the first metal separator 154. The second seal member 156 includes an outer seal 58a and an inner seal 58b provided on the surface 154a of the first metal separator 154. A plurality of closure seals 158 are arranged at predetermined positions in the space between the outer seal 58a and the inner seal 58b (see FIGS. 17 and 18). The closure seals 158 are formed separately from the second seal member 156, and formed in a line shape in advance. Preferably, the closure seals 158 and the second seal member 156 are made of the same material.

In the sixth embodiment of the present invention, it is possible to reliably prevent the shortcut of the reactant gas supplied to the fuel cell 150, i.e., prevent the reactant gas from flowing around the electrode surface. With the simple structure, the power generation can be performed efficiently and economically. In the sixth embodiment, the same advantages as with the fifth embodiment can be obtained.

Figure 19:
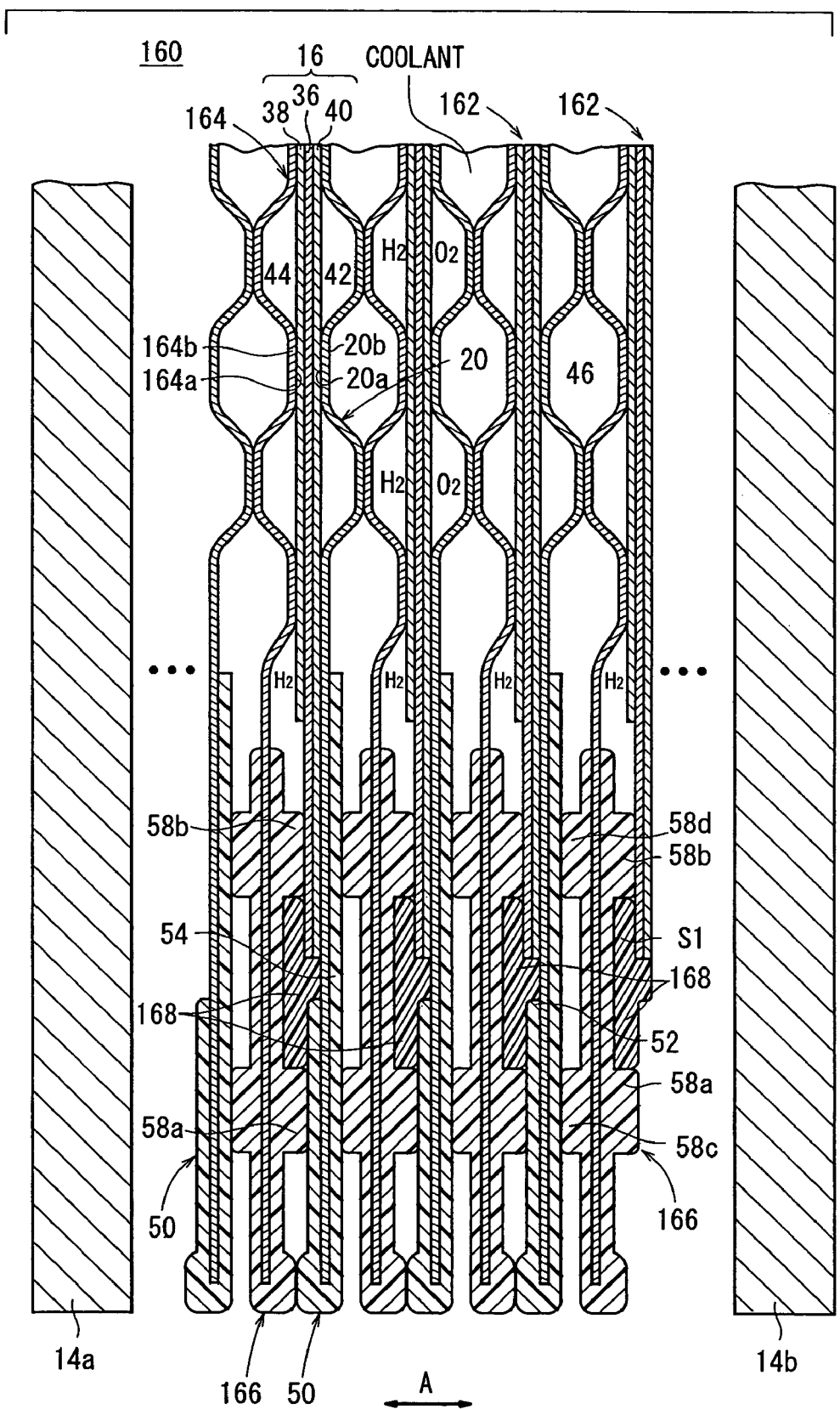
FIG. 19 is a cross sectional view showing a fuel cell according to a seventh embodiment of the present invention.

FIG. 19 is a cross sectional view showing a fuel cell 160 according to a seventh embodiment of the present invention.

Figure 20:
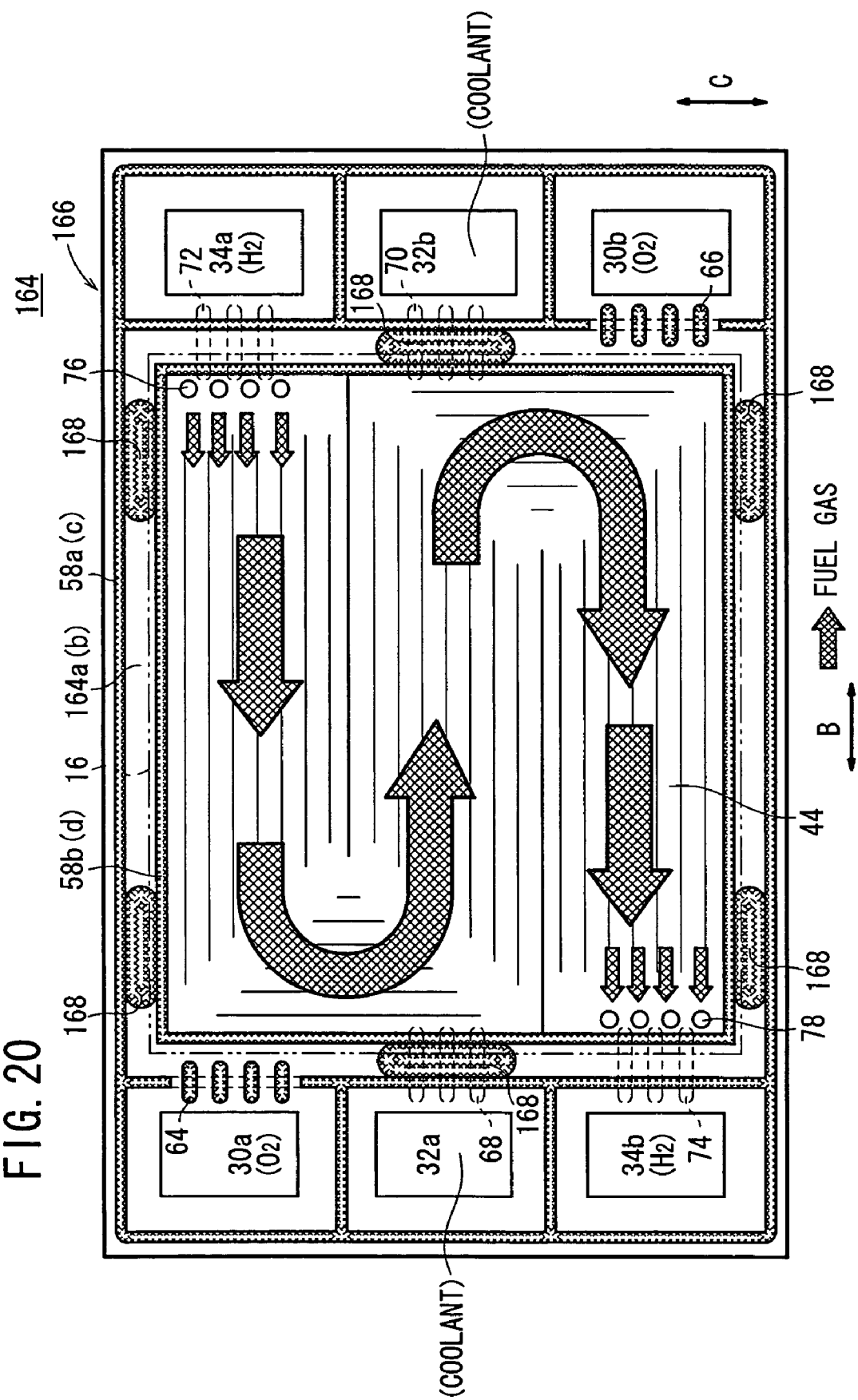
FIG. 20 is a front view showing a first metal separator of the fuel cell.
Figure 21:
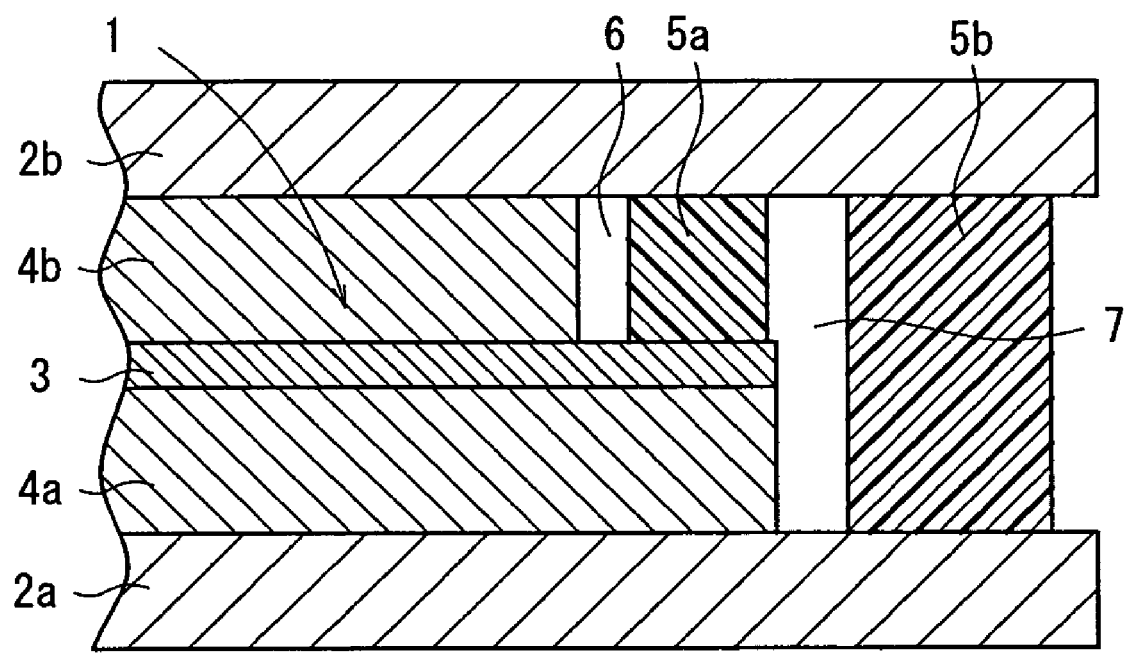
FIG. 21 is a view showing a conventional seal structure.

Each of the power generation cells 162 of the fuel cell 160 includes a first metal separator 164. A second seal member 166 is formed integrally on surfaces 164a, 164b of the first metal separator 164. The second seal member 166 includes an outer seal 58a and an inner seal 58b provided on the surface 164a of the first metal separator 164. A plurality of liquid seals (closure seals) are arranged at predetermined positions in the space between the outer seal 58a and the inner seal 58b (see FIGS. 19 and 20). In the seventh embodiment, the same advantages as with the third embodiment can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell including a membrane electrode assembly and first and second separators sandwiching said membrane electrode assembly, said membrane electrode assembly including a first electrode, a second electrode, and an electrolyte membrane interposed between said first electrode and said second electrode, wherein reactant gas flow fields are formed between said membrane electrode assembly and said first and second separators for supplying reactant gases along said first and second electrodes, said fuel cell comprising:
- a seal member formed at least on said first separator to cover an outer edge of said first separator, said seal member including an outer seal and an inner seal facing said first electrode; and
- a plurality of closure seals provided in a space between an inner edge of said inner seal and a protrusion forming said reactant gas flow field adjacent to said inner edge, said closure seals preventing flow of said reactant gas along said space;
- wherein said inner seal, said outer seal and said plurality of closure seals are provided between said first separator and said second separator sandwiching said membrane electrode assembly.

2. A fuel cell according to claim 1, wherein said closure seals protrude integrally from said inner edge of said inner seal, and inclined in a direction away from said first separator.

3. A fuel cell according to claim 1, wherein said closure seals are liquid seals filled in said space between said inner edge of said inner seal and said protrusion forming said reactant gas flow field.

4. A fuel cell according to claim 1, wherein said closure seals are solid seals provided in said space between said inner edge of inner seal and said protrusion forming said reactant gas flow field.

5. A fuel cell according to claim 1, wherein said reactant gas flow fields are formed along surfaces of said first and second separators, and each of said reactant gas flow fields comprises a serpentine groove having a turn region.

6. A fuel cell according to claim 1, wherein said first and second separators are metal separators.

7. A fuel cell including a membrane electrode assembly and first and second separators sandwiching said membrane electrode assembly, said membrane electrode assembly including a first electrode, a second electrode, and an electrolyte membrane interposed between said first electrode and said second electrode, wherein surface area of said second electrode is larger than surface area of said first electrode, said fuel cell comprising:
- a seal member provided at least on a surface of said first separator facing said first electrode, said seal member including:
  - an inner seal provided between said electrolyte membrane and said first separator, and
  - an outer seal provided between said first and second separators; and
- a plurality of closure seals provided in a space between said inner seal and said outer seal for preventing flow of reactant gas along said space, said plurality of closure seals being separate and distinct from said inner seal and said outer seal;
- wherein said inner seal, said outer seal and said plurality of closure seals are provided between said first separator and said second separator sandwiching said membrane electrode assembly.

8. A fuel cell according to claim 7, wherein said closure seals are liquid seals filled in said space between said inner seal and said outer seal.

9. A fuel cell according to claim 7, wherein said closure seals are solid seals provided in said space between said inner seal and said outer seal.

10. A fuel cell according to claim 7, wherein reactant gas flow fields are formed along surfaces of said first and second separators for supplying reactant gases to said first and second electrodes, and each of said reactant gas flow fields comprises a serpentine groove having a turn region.

11. A fuel cell according to claim 7, wherein said first and second separators are metal separators.

* * * * *